US012640465B2

(12) United States Patent
Morimoto et al.

(10) Patent No.: US 12,640,465 B2
(45) Date of Patent: May 26, 2026

(54) TRANSPARENT ANTENNA, ANTENNA ARRAY, AND DISPLAY MODULE

(71) Applicant: AGC Inc., Tokyo (JP)

(72) Inventors: Yasuo Morimoto, Tokyo (JP); Nobuhiro Nakamura, Tokyo (JP); Masanobu Isshiki, Tokyo (JP)

(73) Assignee: AGC Inc., Tokyo (JP)

( * ) Notice: Subject to any disclaimer, the term of this patent is extended or adjusted under 35 U.S.C. 154(b) by 640 days.

(21) Appl. No.: 18/045,269

(22) Filed: Oct. 10, 2022

(65) Prior Publication Data

US 2023/0063968 A1 Mar. 2, 2023

Related U.S. Application Data

(63) Continuation of application No. PCT/JP2021/015048, filed on Apr. 9, 2021.

(30) Foreign Application Priority Data

Apr. 27, 2020 (JP) ................................ 2020-078662

(51) Int. Cl.
*H01Q 1/38* (2006.01)
*H01Q 1/42* (2006.01)

(52) U.S. Cl.
CPC ................ *H01Q 1/38* (2013.01); *H01Q 1/42* (2013.01)

(58) Field of Classification Search
CPC ............ H01Q 1/38; H01Q 1/42; H01Q 5/371; H01Q 9/045; H01Q 9/42; H01Q 13/085; H01Q 19/30; H01Q 1/243
See application file for complete search history.

(56) References Cited

U.S. PATENT DOCUMENTS 7,417,588 B2 * 8/2008 Castany ................ H01Q 21/30 343/702
7,847,753 B2 * 12/2010 Ishibashi ................ H01Q 9/30 343/702
(Continued)

FOREIGN PATENT DOCUMENTS

CN 112582783 A * 3/2021 ............... H01Q 1/36
EP 3114728 B1 * 6/2021 ............ G06F 3/041
(Continued)

OTHER PUBLICATIONS

International Search Report issued Jul. 13, 2021 in PCT/JP2021/015048, filed on Apr. 9, 2021, 2 pages.

*Primary Examiner* — David E Lotter
*Assistant Examiner* — Bamidele A Immanuel
(74) *Attorney, Agent, or Firm* — Oblon, McClelland, Maier & Neustadt, L.L.P.

(57) ABSTRACT

A transparent antenna includes a transparent substrate; and a metal thin wire layer on an upper side of the transparent substrate. The transparent substrate has a thickness of 300 μm or less. The metal thin wire layer has an opening ratio of 80% or more. When a metal conductor having a surface resistivity ρ Ω/sq is placed parallel to the transparent antenna 0.15 mm apart, an input reflection coefficient S11(ρ, f) and a radiation efficiency Eff(ρ, f) at a frequency f satisfy relations $$S11(0.1\Omega/\mathrm{sq}, f1\ \mathrm{GHz}) < -3\ \mathrm{dB},$$

$$S11(0.1\Omega/\mathrm{sq}, f2\ \mathrm{GHz}) < -3\ \mathrm{dB},\ \text{and}$$

$$|\mathrm{Eff}(0.1\Omega/\mathrm{sq}, f1\ \mathrm{GHz}) - \mathrm{Eff}(0.1\Omega/\mathrm{sq}, f2\ \mathrm{GHz})| < 25\%$$

at two frequencies f1 and f2 that are between 2 GHz and 50 GHz.

14 Claims, 15 Drawing Sheets

(56) References Cited

U.S. PATENT DOCUMENTS

| | | | | | |
|---|---|---|---|---|---|
| 8,570,225 | B2 * | 10/2013 | Shoji | H01Q 1/243 | 343/702 |
| 10,879,585 | B2 * | 12/2020 | Shin | H01Q 21/28 | |
| 2005/0259031 | A1 * | 11/2005 | Sanz | H01Q 1/243 | 343/702 |
| 2011/0090131 | A1 * | 4/2011 | Chen | H01Q 5/49 | 343/815 |
| 2011/0237309 | A1 * | 9/2011 | Shoji | H01Q 9/42 | 343/893 |
| 2016/0093943 | A1 * | 3/2016 | Yang | G06F 1/1698 | 343/702 |
| 2017/0309991 | A1 * | 10/2017 | Noori | H01Q 1/2258 | |
| 2019/0058264 | A1 * | 2/2019 | Jung | H01Q 9/0435 | |
| 2019/0386387 | A1 * | 12/2019 | Kim | H01Q 1/22 | |
| 2020/0083600 | A1 * | 3/2020 | Hagiwara | H01Q 21/30 | |
| 2022/0037777 | A1 * | 2/2022 | Suzuki | H05K 3/10 | |
| 2022/0359980 | A1 * | 11/2022 | Lin | H01Q 1/38 | |
| 2023/0420849 | A1 * | 12/2023 | Magray | H01Q 1/243 | |
| 2024/0170854 | A1 * | 5/2024 | Jin | H01Q 1/38 | |
| 2024/0283135 | A1 * | 8/2024 | Kim | H01Q 9/40 | |

FOREIGN PATENT DOCUMENTS

| | | | | |
|---|---|---|---|---|
| JP | 2013-5013 | A | 1/2013 | |
| JP | 5682464 | B2 * | 3/2015 | H01Q 1/38 |
| WO | WO 2019/163087 | A1 | 8/2019 | |

* cited by examiner

REFLECTION CHARACTERISTIC S11

〈COMPARATIVE EXAMPLE〉

FIG.14

| TYPE | $\rho$ OF METAL CON-DUCTOR [$\Omega$/sq] | REFLECTION COEFFICIENT S11 [dB] | | DIFFERENCE IN RADIATION EFFICIENCY [%] Eff($\rho$, 28 GHz) − Eff($\rho$, 39 GHz) |
|---|---|---|---|---|
| | | 28 GHz | 39 GHz | |
| MONOPOLE (PSEUDO-DISPLAY MODULE IN FIG. 8 CONTAINING TRANSPARENT ANTENNA 100) | 0.1 | −13 | −12 | +14 |
| MONOPOLE (PSEUDO-DISPLAY MODULE IN FIG. 8 CONTAINING TRANSPARENT ANTENNA 100) | 10 | −11.2 | −18.5 | +17 |
| YAGI-UDA (PSEUDO-DISPLAY MODULE CONTAINING TRANSPARENT ANTENNA 100A IN FIG. 10) | 0.1 | −6.4 | −4.1 | +4.7 |
| YAGI-UDA (PSEUDO-DISPLAY MODULE CONTAINING TRANSPARENT ANTENNA 100A IN FIG. 10) | 10 | −9.2 | −5.0 | −1.4 |
| PATCH IN COMPARATIVE EXAMPLE (PSEUDO-DISPLAY MODULE CONTAINING TRANSPARENT ANTENNA 900 IN FIG. 12) | 0.1 | −18.6 | −6 | +33 |

TRANSPARENT ANTENNA, ANTENNA ARRAY, AND DISPLAY MODULE

CROSS-REFERENCE TO RELATED APPLICATION

The present application is a continuation application of International Application No. PCT/JP2021/015048, filed Apr. 9, 2021, which claims priority to Japanese Patent Application No. 2020-078662 filed Apr. 27, 2020. The contents of these applications are incorporated herein by reference in their entirety.

BACKGROUND OF THE INVENTION

1. Field of the Invention

The present disclosure relates to a transparent antenna, an antenna array, and a display module including the transparent antenna.

2. Description of the Related Art

In recent years, a fifth-generation mobile communication system (5G) and a sixth-generation mobile communication system (6G) have been developed as a communication technology in mobile communication apparatuses such as smartphones, tablets, cellular phones, and laptop computers.

According to the feature of the millimeter wave called the fifth-generation mobile communication system (5G) that has a strong directivity and a relatively short reach distance, and is easily shielded by metal or the like, a technique for arranging a transparent antenna on a display (OLED, LCD, LED) or a touch panel (including a display-integrated metal thin wire panel) has been proposed as an antenna for 5G (See, for example, Japanese Unexamined Patent Application Publication No. 2013-5013 and U.S. Patent Application Publication No. 2019/0058264).

On the other hand, in some countries, for example, two or more bands are assigned to the fifth-generation mobile communication system (5G). The assigned frequency slightly varies from country to country, but for example, 2 frequency bands, 24.2 to 29.5 GHz and 37.3 to 40 GHz, or 2 frequency bands, 3.3 to 5.0 GHz and 24.2 to 29.5 GHz, may be assigned. Therefore, as an antenna for a recent mobile communication apparatus, there is desired a transparent antenna which can be arranged on a display and is compatible with multiband.

SUMMARY OF THE INVENTION

Problem to be Solved by the Invention

However, according to the techniques of Japanese Unexamined Patent Application Publication No. 2013-5013 and U.S. Patent Application Publication No. 2019/0058264, an antenna element of each of the transparent antennas is a patch antenna including a planar element composed of a mesh and a ground layer, and the patch antenna requires a ground layer on the back surface facing an antenna pattern. Here, in the patch antenna, since the antenna characteristics are good when the ground layer is separated from a layer of the antenna pattern, a substrate of the patch antenna becomes thick within a mountable range.

Further, in the techniques disclosed in Japanese Unexamined Patent Application Publication No. 2013-5013 and U.S. Patent Application Publication No. 2019/0058264, a single-band antenna that communicates in only one band is disclosed, and communication in two or more frequency bands in the 5G frequency band has not been studied.

In view of the above-described situation, an object of the present invention is to provide a transparent antenna capable of communicating in at least two bands of 5G and capable of reducing the antenna thickness.

Means for Solving the Problem

In order to solve the above-described problem, according to an aspect of the present invention, a transparent antenna including a transparent substrate; and a metal thin wire layer on an upper side of the transparent substrate, the transparent substrate having a thickness of 300 μm or less, the metal thin wire layer has an opening ratio of 80% or more, and when a metal conductor having a surface resistivity ρ Ω/sq being placed parallel to the transparent antenna 0.15 mm apart, an input reflection coefficient S11(ρ, f) and a radiation efficiency Eff(ρ, f) at a frequency f satisfying relations $$S11(0.1\,\Omega/\text{sq}, f1\ \text{GHz}) < -3\ \text{dB},$$

$$S11(0.1\,\Omega/\text{sq}, f2\ \text{GHz}) < -3\ \text{dB, and}$$

$$|\text{Eff}(0.1\,\Omega/\text{sq}, f1\ \text{GHz}) - \text{Eff}(0.1\,\Omega/\text{sq}, f2\ \text{GHz})| < 25\%$$

at two frequencies f1 and f2 that are between 2 GHz and 50 GHz, is provided.

Effect of the Invention

According to one aspect, in the transparent antenna, communication is possible in at least two bands of 5G, and the antenna thickness can be reduced.

BRIEF DESCRIPTION OF DRAWINGS

Other objects and further features of the present disclosure will be apparent from the following detailed description when read in conjunction with the accompanying drawings, in which:

FIG. 14 is a diagram showing radiation coefficients and radiation efficiencies in the transparent antennas of the first configuration example and the second configuration example of the present invention, and the comparative example.

DESCRIPTION OF THE PREFERRED EMBODIMENT

Figure 1:
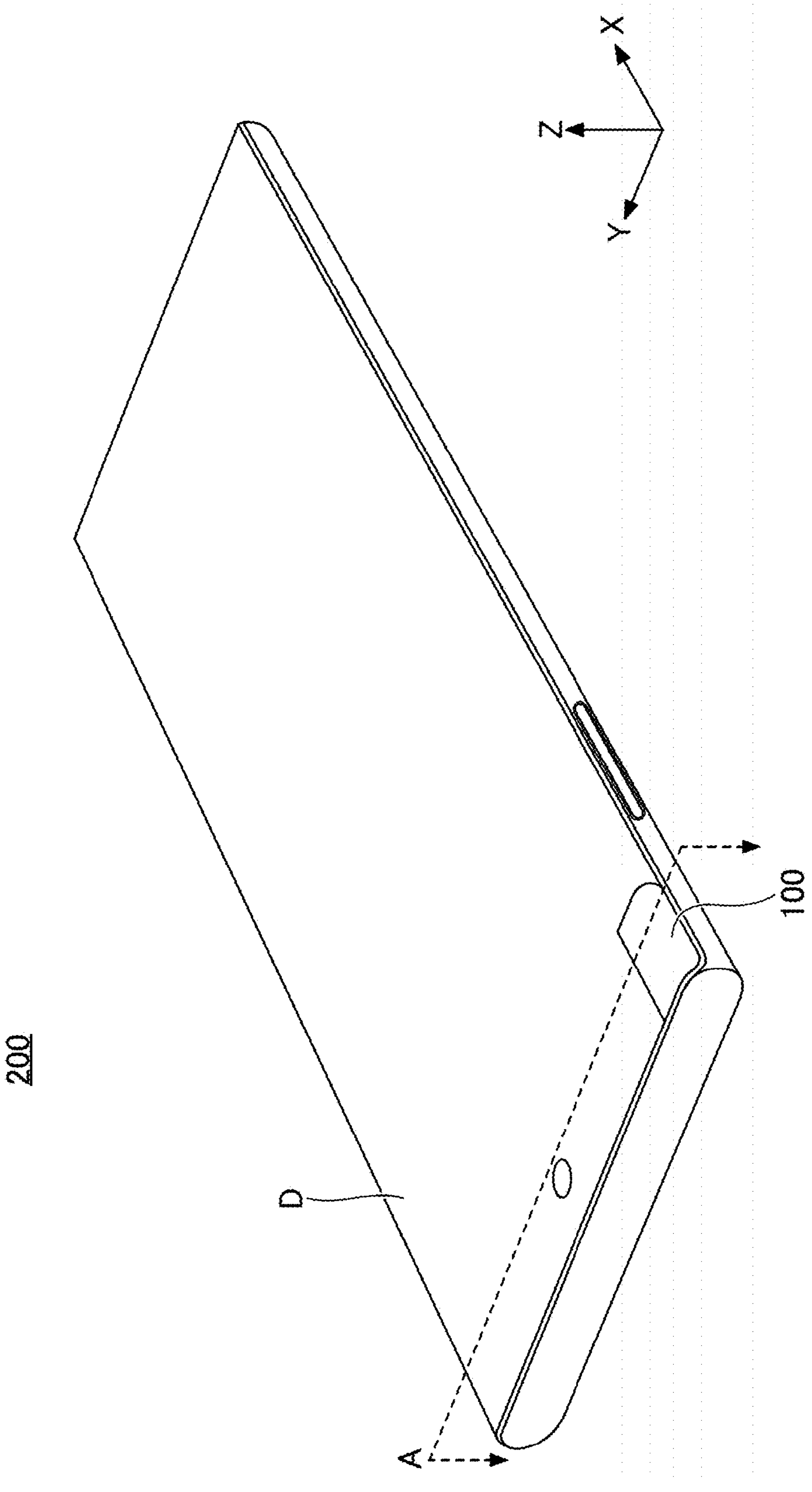
FIG. 1 is an overall view of an electronic apparatus with a display and shows a location of a transparent antenna.

Hereinafter, a mode for carrying out the present invention will be described with reference to drawings. In each drawing, the same components will be denoted by the same reference numeral, and duplicate descriptions may be omitted. Hereinafter, embodiments in which the transparent antenna of the present invention is applied will be described.

A transparent antenna 100 of the present invention is applicable to a fifth-generation mobile communication system (5G), or a sixth-generation mobile communication system (6G), as an example.

<Electronic Apparatus>

Figure 2:
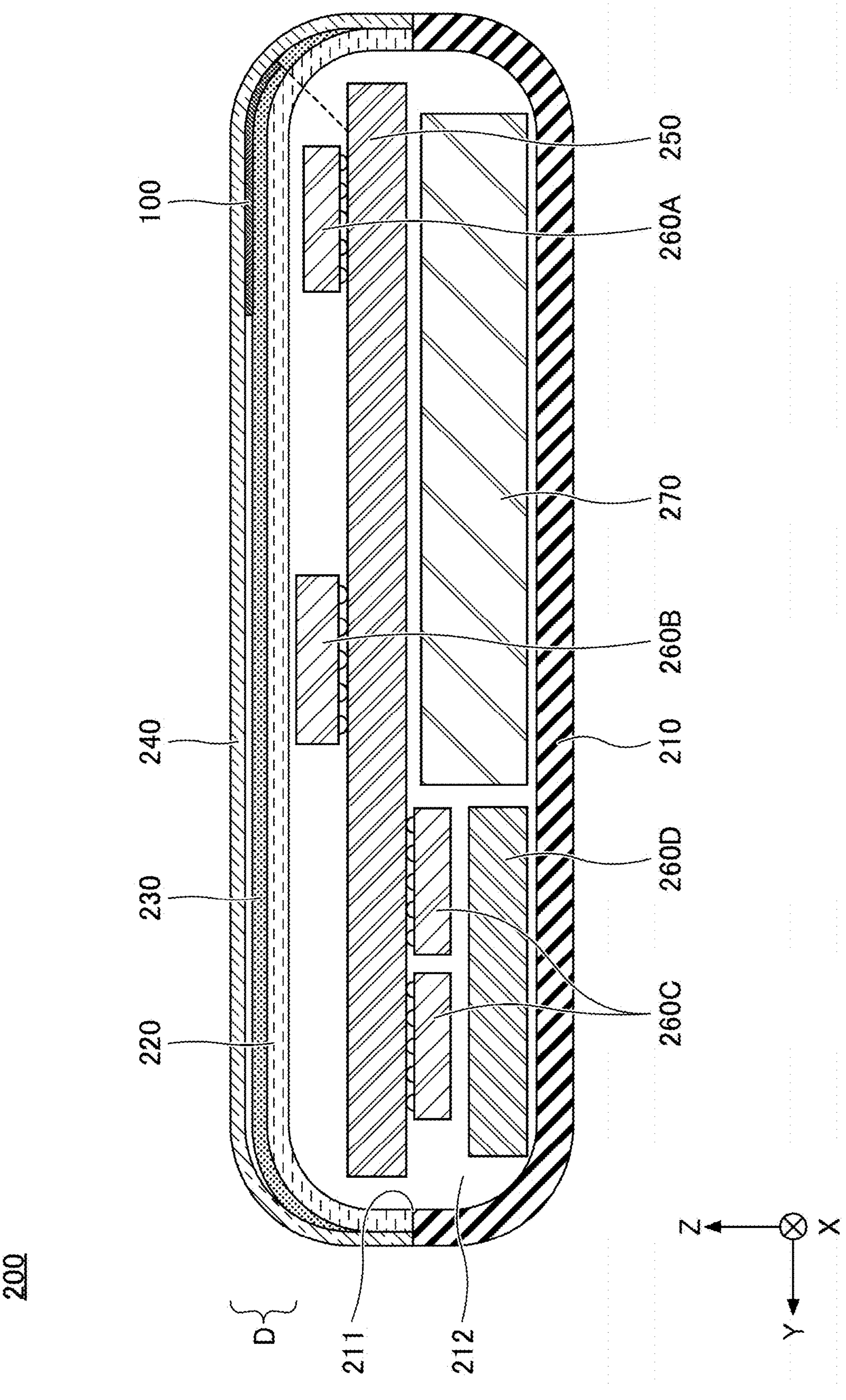
FIG. 2 is a cross-sectional view of the electronic apparatus of FIG. 1 cut along a plane AA.

Referring to FIGS. 1 and 2, a configuration of an electronic apparatus 200, as an example of a communication apparatus, in which a display module D including the transparent antenna 100 of the present invention is mounted, will be described. FIG. 1 is an overall view of the electronic apparatus 200, in which the display module D of the present invention is mounted, and a view showing a position of the transparent antenna 100. FIG. 2 is a cross-sectional view cut along a plane A of the electronic apparatus 200 of FIG. 1.

In FIGS. 1 and 2, the X direction indicates a width direction of the electronic apparatus 200, the Y direction indicates a length direction of the electronic apparatus 200, and the Z direction indicates a height direction of the electronic apparatus 200. Hereinafter, an XYZ coordinate system will be defined and described. In addition, for convenience of explanation, a plane view means the XY plane view, and a vertical direction, in which the +Z direction side is the upper side and the −Z direction side is the lower side, and a horizontal direction (lateral direction) with respect to the vertical direction will be described below, but they do not represent the universal vertical and horizontal directions.

Further, in the directions of parallel, right angle, orthogonal, horizontal, orthogonal, vertical, lateral, and the like, a deviation of a degree that does not impair the effect of the disclosure in the embodiment is permitted. The X direction, the Y direction, and the Z direction represent a direction parallel to the X axis, a direction parallel to the Y axis, and a direction parallel to the Z axis, respectively. The X direction, the Y direction, and the Z direction are orthogonal to each other. An XY plane represents a virtual plane parallel to the X direction and the Y direction. A YZ plane represents a virtual plane parallel to the Y direction and the Z direction. A ZX plane represents a virtual plane parallel to the Z direction and the X direction.

The electronic apparatus 200 is, for example, an information processing terminal, such as a smartphone, a tablet computer, or a laptop PC (Personal Computer). The electronic apparatus 200 is not limited to these, and may be, for example, a structure such as a column or a wall, digital signage, an electronic apparatus including a display panel in a train, or an electronic apparatus including various display panels in a vehicle.

As shown in FIGS. 1 and 2, a display module D capable of performing a display function is disposed on an entire upper surface or at least a part of the upper surface of the electronic apparatus 200. The transparent antenna 100 of the present invention is disposed on a touch panel 230 on a display panel 220. The transparent antenna 100 is visible from the outside of the electronic apparatus 200 through a transparent cover 240, and is transparent so that the display panel 220 can be visible from the outside through the transparent antenna 100.

Referring to FIG. 2, in the electronic apparatus 200, the display panel 220, the touch panel 230, the transparent antenna 100, and the transparent cover 240 are collectively referred to as the display module D (also referred to as an indication module).

In addition to the display module D, the electronic apparatus 200 includes a housing 210, a wiring board 250, electronic parts 260A, 260B, 260C, 260D, a battery 270, and the like.

In FIGS. 1 and 2, an example where the electronic apparatus 200, in which the transparent antenna 100 is mounted, is a smartphone, is shown, but the electronic apparatus, in which the transparent antenna of the present invention is mounted, may have other configurations, as long as the electronic apparatus includes the housing 210, the transparent cover 240, and the display panel 220. The electronic apparatus 200 may be an apparatus that is not provided with the touch panel 230.

The housing 210 is, for example, a case made of metal, resin, or both, and covers the lower surface and the side surface of the electronic apparatus 200. The housing 210 has an open end 211 serving as an upper end of a peripheral wall, and the transparent cover 240 is attached to the open end 211. The housing 210 has a storage part 212 which is an internal space communicating with the open end 211, and the storage part 212 stores a wiring board 250, the electronic parts 260A to 260D, the battery 270, and the like.

The transparent cover 240, which is an example of cover glass, is a transparent glass plate provided on the uppermost surface, and has a size matching with the open end 211 of the housing 210 in a plan view. In this example, the transparent cover 240 is a mostly flat glass plate whose both ends in the width direction (+−X direction) are gently curved downward. Alternatively, both ends of the transparent cover 240 may be gently curved downward even in the length direction (Y direction) of the electronic apparatus 200. Although the transparent cover 240 made of glass will be described here, the transparent cover 240 may be made of resin.

When the transparent cover 240 is attached to the open end 211 of the housing 210, the storage part 212 of the housing 210 is sealed.

The upper surface of the transparent cover 240 is an example of an outer surface of the transparent cover 240, and the lower surface of the transparent cover 240 is an example of an inner surface of the transparent cover 240. The transparent antenna 100 and the touch panel 230 are provided on the inner surface side of the transparent cover 240. Since the transparent cover 240 is transparent, the touch panel 230 and the display panel 220 provided therein are visible from the outside of the electronic apparatus 200 through the transparent cover 240.

The electronic parts 260A to 260C are mounted on the wiring board 250. A power supply line or the like extending from a power supply region 120 (see FIG. 5) of the transparent antenna is connected to the wiring board 250. The wiring board 250 and the power supply region 120 of the transparent antenna 100 may be connected by using a connector, an ACF (Anisotropic Conductive Film), or the like, and may be connected by the other components.

The electronic part 260A is, as an example, a communication module connected to the power supply region 120 of the transparent antenna 100 via the wiring of the wiring board 250 and performs processing of signals transmitted or received via the transparent antenna 100. The central electronic part 260B is, for example, a camera.

As an example, the electronic parts 260C and 260D are components that perform information processing or the like related to the operation of the electronic apparatus 200, and are implemented by, for example, a computer including a CPU (Central Processing Unit), RAM (Random-Access Memory), ROM (Read-Only Memory), an HDD (Hard Disk Drive), an input/output interface, an internal bus, and the like.

The battery 270 is a rechargeable secondary battery and supplies power necessary for the operation of the display module D, the electronic parts 260A to 260D, and the like.

<Display Module>

Figure 3:
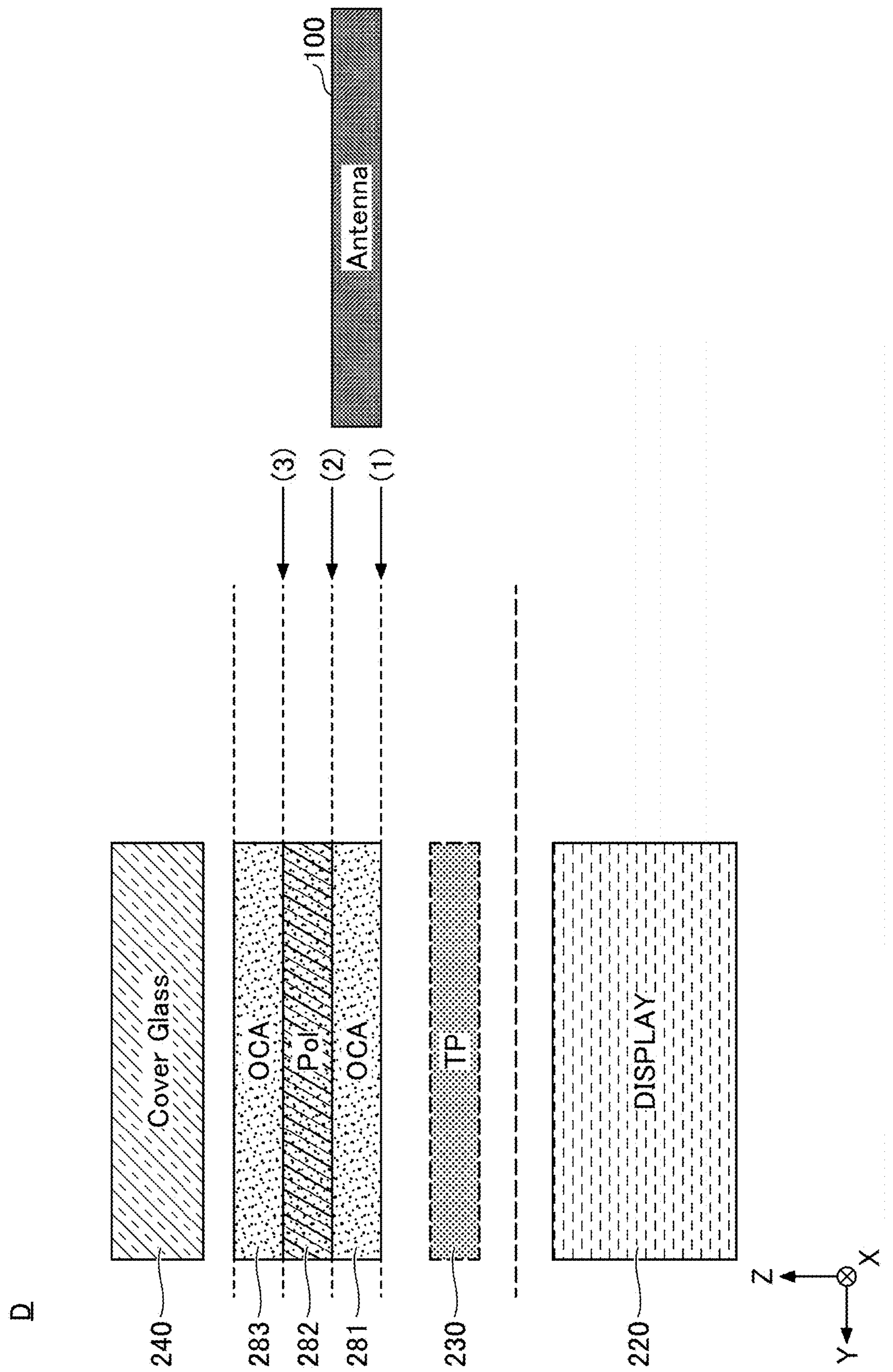
FIG. 3 is an exploded sectional view showing a display module in detail.

Next, the position of the transparent antenna 100 in the display module D will be described. FIG. 3 is an exploded sectional view of the display module D.

Although not shown in FIG. 2, as shown in FIG. 3, the display module D has an inner adhesive layer 281, a polarization plate 282, and an outer adhesive layer 283 between the touch panel 230 and the transparent cover 240. The inner adhesive layer 281 and the outer adhesive layer 283 are made of a transparent optical adhesive OCA (Optical Clear Adhesive).

As shown by arrows in FIG. 3, the transparent antenna 100 of the present invention is provided (1) between the touch panel 230 and the inner adhesive layer 281, (2) between the inner adhesive layer 281 and the polarization plate 282, or (3) between the polarization plate 282 and the outer adhesive layer 283.

An adhesive layer may be provided between the touch panel 230 and the display panel 220. Alternatively, the touch panel 230 may be a "metal thin wire layer for on-cell touch panel" formed directly on the surface of the display panel 220 without providing an adhesive layer.

Although FIGS. 2 and 3 show an example in which the touch panel 230 is provided in the display module D, the display module D mounted in the electronic apparatus 200 need not necessarily be provided with the touch panel 230. When the touch panel 230 is not to be mounted, the transparent antenna 100 may be disposed between the display panel 220 and the inner adhesive layer 281 as the case (1).

The display panel 220 is, for example, a liquid crystal display panel, an organic electro-luminescence (EL) display panel, or an organic light emitting diode (OLED) display panel. The display panel 220 is arranged on the lowest side of the display module D in any configuration.

Since the transparent antenna 100 is provided partially in the display module D, in the area where the transparent antenna 100 is provided, the touch panel 230, the inner adhesive layer 281, the polarization plate 282, the outer adhesive layer 283, or any combination thereof may be made thinner than in other areas, or the inner adhesive layer 281, the polarization plate 282, the outer adhesive layer 283, or any combination thereof may be excluded from the configuration. Thus, in the display module D, it is possible to prevent only a portion of the surface of the transparent antenna 100 from rising.

However, it has been found that if the transparent antenna 100 is too thick, an edge portion of the transparent antenna may be visible, and air may easily enter from a boundary with the adhesive layer 283, which would be problematic. The thickness of a transparent substrate 101 (see FIG. 5) of the transparent antenna 100 is preferably 300 μm or less, more preferably 150 μm or less, and particularly preferably 100 μm or less. From the viewpoint of easiness of handling, the thickness of the transparent antenna 100 is preferably 10 μm or more, and more preferably 50 μm or more.

In FIGS. 1 and 2, an example, in which both ends of the display module D in the +−Y direction are gently curved, was shown, but the display module D may have a planar shape in which the ends are not bent. In this case, the transparent antenna 100 may also have a planar shape. In the case where the transparent antenna 100 is partially curved, the power supply region, which will be described later, is curved.

<Example of 5G Frequency Band and Operation Band of Transparent Antenna of the Present Invention>

Figure 4:
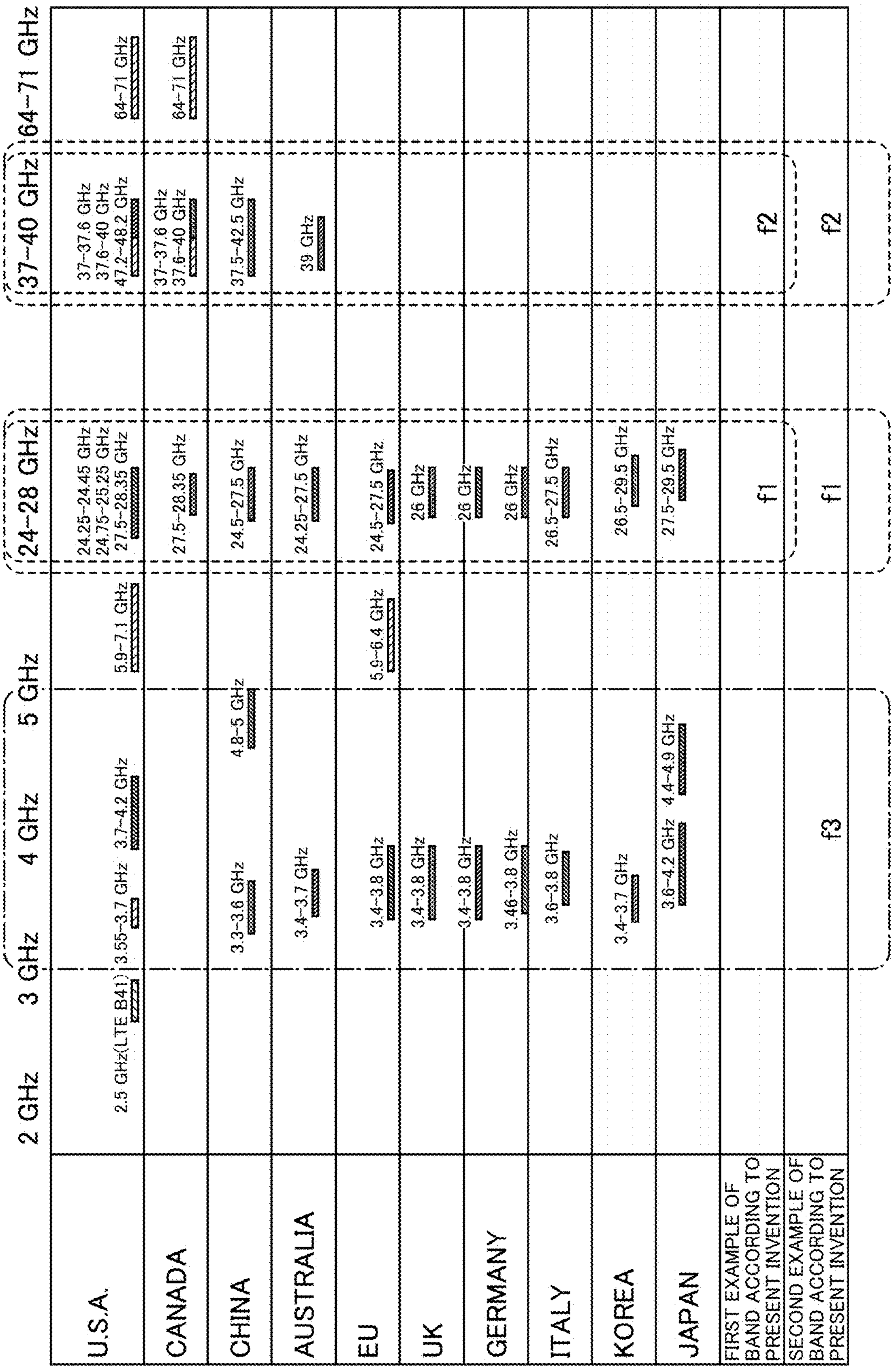
FIG. 4 is a diagram showing the frequency bands assigned to 5G in each of the countries and an example of a band for the transparent antenna of the present invention.

FIG. 4 is a diagram showing a frequency band allocated to the fifth-generation mobile communication system (5G) in each country and an example of an operable band of the transparent antenna of the present invention. The transparent antenna 100 of the present invention is set to operate in two bands f1 and f2 in the 5G band, that is, to resonate in two frequency bands.

As an example (band example 1) of the two frequency bands f1 and f2, the frequency f1 is 24.2 to 29.5 GHz and the frequency f2 is 37.3 to 40 GHz. By setting to the bands, as shown in FIG. 4, it is possible to support two 5G bands set in the United States, China, and Australia. In the following description, the center frequency in the frequency f1 is 28 GHz and the center frequency in the frequency f2 is 39 GHz.

In addition to the two frequency bands, it may be applicable to 3.3 to 5.0 GHz, as a frequency f3. By setting to the bands, as shown in FIG. 4, it is possible to support two 5G bands set in the US, Canada, China, Australia, EU, UK, Germany, Italy, South Korea, and Japan, and three 5G bands set in the US, China, and Australia.

First Configuration Example of Antenna

Figure 5:
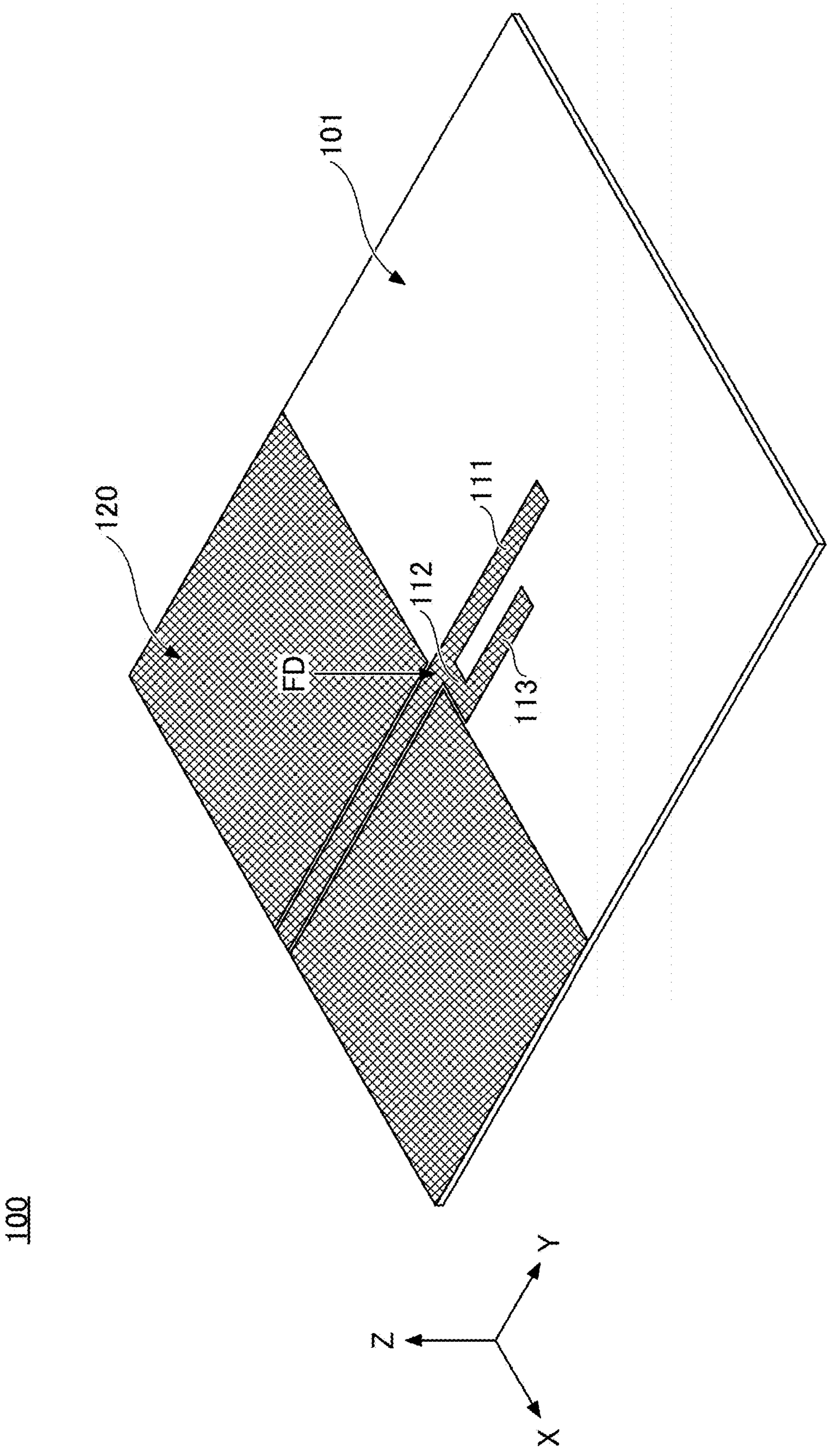
FIG. 5 is a perspective view of a transparent antenna according to a first configuration example.
Figure 6:
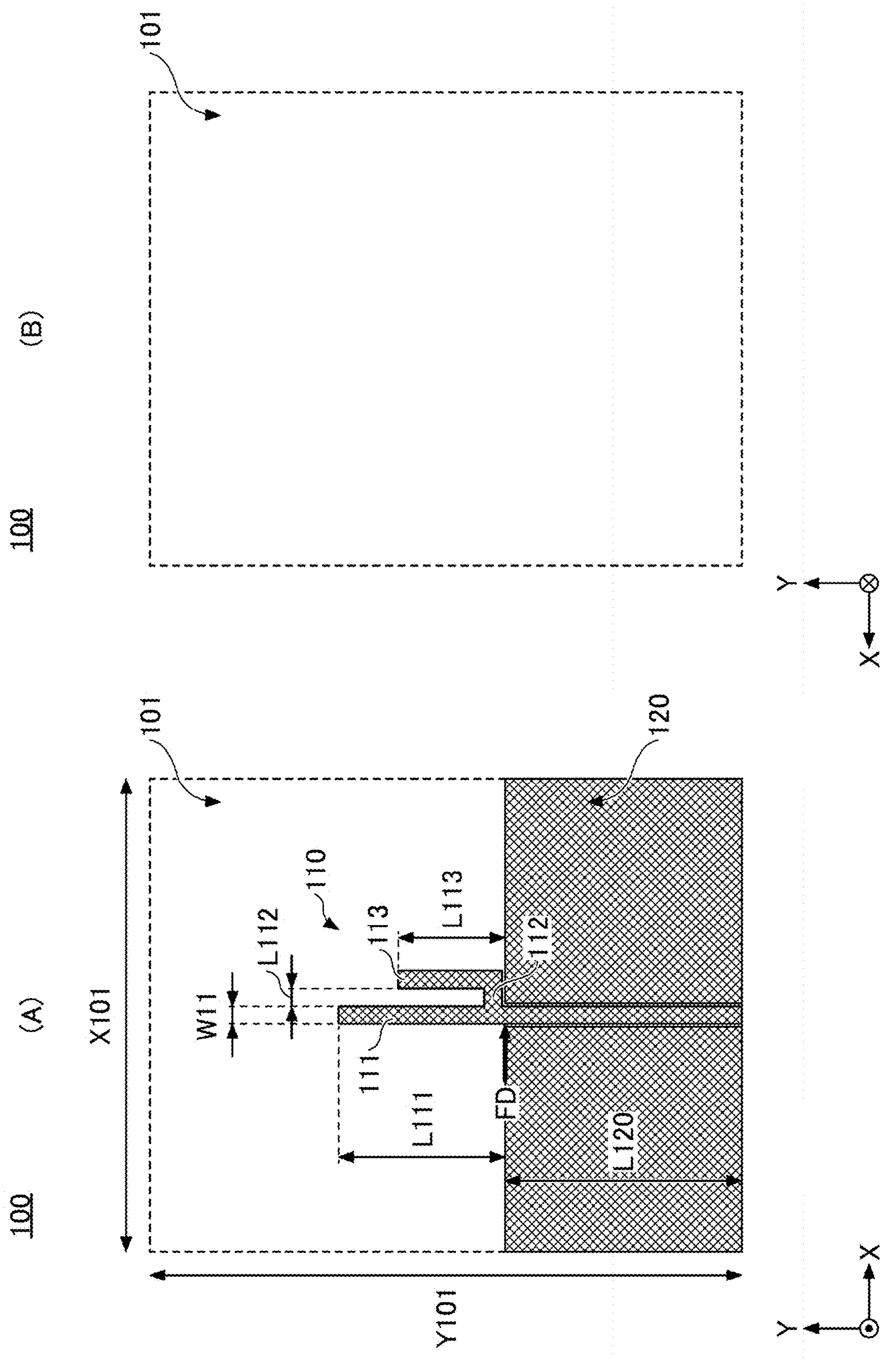
FIG. 6 is a top view (A) and a bottom view (B) of the transparent antenna according to the first configuration example.

Next, the configuration of the transparent antenna 100 according to the first configuration example of the present invention will be described with reference to FIGS. 5 to 7. FIG. 5 is a perspective view of the transparent antenna 100 according to the first configuration example of the present invention. FIG. 6 is an explanatory view of the transparent antenna 100 according to the first configuration example. (A) of FIG. 6 is a top view viewed from the +Z direction and (B) of FIG. 6 is a bottom view viewed from the −Z direction. Note that even in the case where a portion of the transparent antenna 100 is disposed along a curve as shown in FIG. 1, FIG. 5 shows a state before the transparent antenna 100 is bent in parallel with the XY plane.

The transparent antenna 100 has a transparent substrate 101. The antenna pattern 110 and a power supply region 120 are provided on the transparent substrate 101. The antenna pattern 110 of this configuration is an example of a monopole type antenna.

The transparent substrate 101 is, for example, a flexible substrate made of polyimide and can be bent in the Z direction, the X direction, or both directions. The transparent substrate 101 is colorless and transparent.

The power supply region 120 is disposed at a longitudinal end portion (end portion in the −Y direction) of the transparent substrate 101, and the power supply region 120 is electrically connected to a first wire element 111 of the antenna pattern 110. In this configuration example, the power supply region 120 is a planar power supply section on which power supply wiring is formed, and is provided only on the upper surface side (+Z side) of the transparent substrate 101.

When the transparent antenna 100 is incorporated into the electronic apparatus 200, the power supply region 120 is electrically connected to the wiring board 250 and the electronic part 260A which is a communication circuit. In FIG. 5, as an example, the power supply region 120 has a structure of about ½ from the end portion in the −Y direction. The range of the power supply region 120 may be about ¼ to ¾ in the −Y direction.

Although FIG. 5 shows an example in which an end portion of the power supply region 120 extends to an end portion (end portion in the −Y direction) of the transparent substrate 101, a part or all of the power supply region 120 may be located outside the periphery of the substrate 101. Further, by flexibly forming the power supply region 120, the power supply region 120 may be turned around to the side end or the back surface of the display module D so as to be electrically connected to the side surface or the back surface.

The antenna pattern 110 of this configuration has the first wire element 111, a second wire element 112, and a third wire element 113. In this configuration, all of the elements 111 to 113 are provided on the +Z side, which is the upper surface side of the transparent substrate 101.

Specifically, one end of the first wire element 111 serves as a power supply point F connected to the power supply region 120, and the first wire element 111 extends from the power supply point F in a first direction (+Y direction) which is the transmission direction. The other end of the first wire element 111 is a free end.

The second wire element 112 branches from a periphery of the power supply point F of the first wire element 111 and extends in a second direction (+X direction) orthogonal to the first direction.

The third wire element 113 is bent from the other end of the second wire element 112 and extends in a first direction (+Y direction) substantially parallel to the first wire element 111. The other end of the third wire element 113 is a free end, and the third wire element 113 is shorter than the first wire element 111.

Here, when a conductor length of the first wire element 111 is L111 and a wavelength on the transparent substrate 101 at the resonance frequency f1 (28 GHz) of the transparent antenna 100 is $\lambda_{01}$, L111 is set to be an odd number multiple of about $0.25\lambda_{01}$. Therefore, in order to improve the antenna gain in the frequency band f1, the conductor length L111 of the first wire element 111 may be adjusted, for example, within ±10% of about 2.1 mm.

On the other hand, when a conductor length of the third wire element 113 is L113 and a wavelength on the transparent substrate 101 at the resonance frequency f2 (39 GHz) of the transparent antenna 100 is $\lambda_{02}$, L113 is set to be an odd number multiple of about $0.25\lambda_{02}$. Therefore, in order to improve the antenna gain in the frequency band f2, the conductor length L113 of the third wire element 113 may be adjusted to within ±10% of about 1.325 mm, for example.

<Transparent Conductor of Transparent Antenna>

Figure 7:
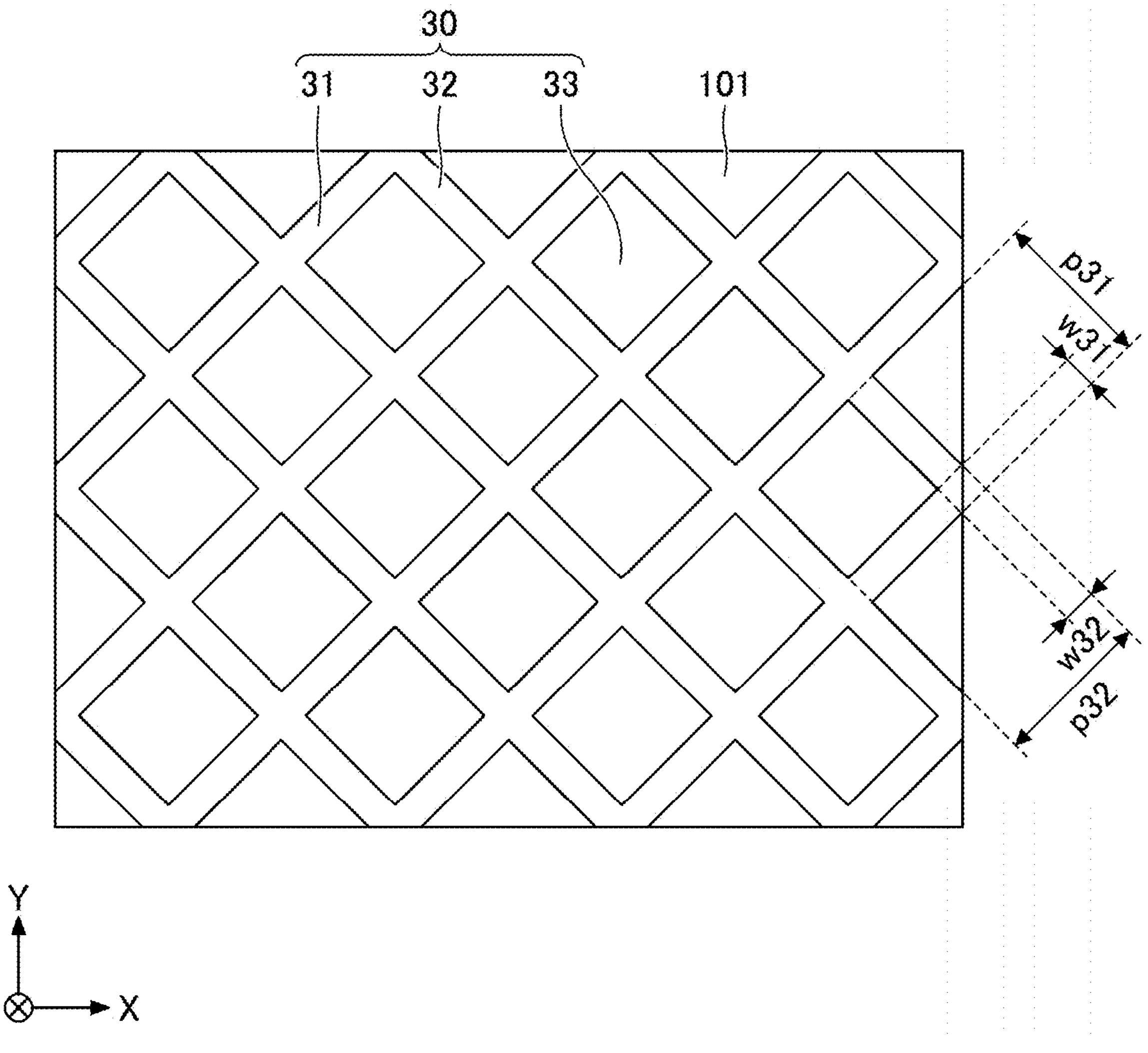
FIG. 7 is an explanatory drawing for a transparent conductor of the transparent antenna of the present invention.

FIG. 7 is an explanatory view of the transparent conductor 30 of the transparent antenna 100 of the present invention. The transparent conductor 30 is formed on the surface of the transparent substrate 101, and is used as an example of constituting the antenna pattern 110 shown in FIGS. 6 and 7 and the planar power supply section of the power supply region 120. The transparent conductor 30 is a conductor having high light transmittance so that it is difficult to recognize with human visual acuity.

More specifically, the transparent conductor 30 is, for example, a layer of a conductive line formed in a mesh shape, that is, a metal thin wire layer, in order to increase light transmittance. As shown in FIG. 7, in the mesh-shaped metal thin wire layer, a plurality of metal thin wires 31 extending in one direction and a plurality of metal thin wires 32 extending in the other direction are provided so as to intersect each other, and an opening (through hole) 33 as a net-like gap (mesh opening) is open.

If the transparent conductor 30 is formed in a mesh, the opening 33 in the mesh may be a square shape or a rhombic shape. When the opening 33 of the mesh is formed in a square shape, the mesh is preferably formed in a square shape and has good design. The opening 33 of the mesh may have a random shape by a self-organization method, and thus, moire can be suppressed. The line widths w31 and w32 of the metal thin wires 31 and the metal thin wires 32 constituting the mesh are preferably 1 to 10 μm, more preferably 1 to 5 μm, and even more preferably 1 to 3 μm. The line spacing (also called mesh opening or pitch) p31 and p32 between the plurality of metal thin wires 31 and the plurality of metal thin wires 32 of the mesh is preferably 300 to 500 μm.

The opening ratio, which is a ratio of an area of the opening 33 to an area of the whole mesh of the transparent conductor 30, is preferably 80% or more, and more preferably 90% or more. As the opening ratio of the transparent conductor 30 is increased, the visible light transmittance of the transparent conductor 30 can be increased.

If the transparent conductor 30 is formed in a mesh, the thickness of the transparent conductor 30 may be 1 to 40 μm. Since the transparent conductor 30 is formed in a mesh shape, visible light transmittance can be increased even if the transparent conductor 30 is thick. The thickness of the transparent conductor 30 is more preferably 5 μm or more, and more preferably 8 μm or more. The thickness of the transparent conductor 30 is more preferably 30 μm or less, even more preferably 20 μm or less, and particularly preferably 15 μm or less.

In the transparent conductor 30, the conductor thickness t is set to be smaller than the line widths (conductor widths) w31, w32 of the mesh-shaped thin wire. If the aspect ratio exceeds 1, it is structurally unbalanced, fragile, and difficult to produce. However, as the conductor thickness t is increased, the sheet resistance value can be made smaller. Thus, the larger the conductor thickness t is, the better the efficiency of the antenna is, and thus t is preferably smaller than w yet as large as possible.

Although copper may be used as a conductor material for the metal thin wires 31 and 32 of the transparent conductor 30, other metal materials such as gold, silver, platinum, aluminum, chromium, tin, iron and nickel may be used. The conductor material is not limited to these materials.

The antenna pattern 110 and the power supply region 120 realized by the transparent conductor 30 are transparent, have high light transmittance so that it is difficult to recognize with human visual acuity, and can function as a conductor. As shown in FIG. 6 (B), the transparent antenna 100 of the first configuration example thus formed does not have a ground layer on the back-surface side, so that the thickness of the transparent antenna 100 can be reduced.

Here, when a transparent antenna without a ground surface is mounted on a portable apparatus such as a smartphone which is required to be downsized, a touch panel or a display is arranged closer to an antenna pattern of the transparent antenna than when the ground surface is provided. However, it has been found in our study that the electrical conductor of the touch panel or the display have finite electrical resistivity depending on the material, in the configuration of the transparent antenna without the ground layer on the back-surface side, the electrical conductor having a predetermined resistance placed close to the antenna may affect the electromagnetic field distribution near the antenna and deteriorate the antenna characteristics. It has also been found that when the materials constituting the display or the touch panel disposed below are different, the characteristics of the antenna may change depending on the surface resistance value (also referred to as an effective surface resistance value or a sheet resistance value at antenna operating frequency) of the materials.

Therefore, there is a need for designing an antenna that can operate stably even when conductors of various surface resistance values are placed close to the antenna.

Simulation Example 1

Therefore, the inventors of the present application carried out various simulation measurements of a pseudo display module PD in a state where a transparent cover 240 and a metal conductor M having a resistance are provided above and below the transparent antenna 100 of the present invention shown in FIG. 5 in order to confirm the influence of the adjacent conductors.

Figure 8:
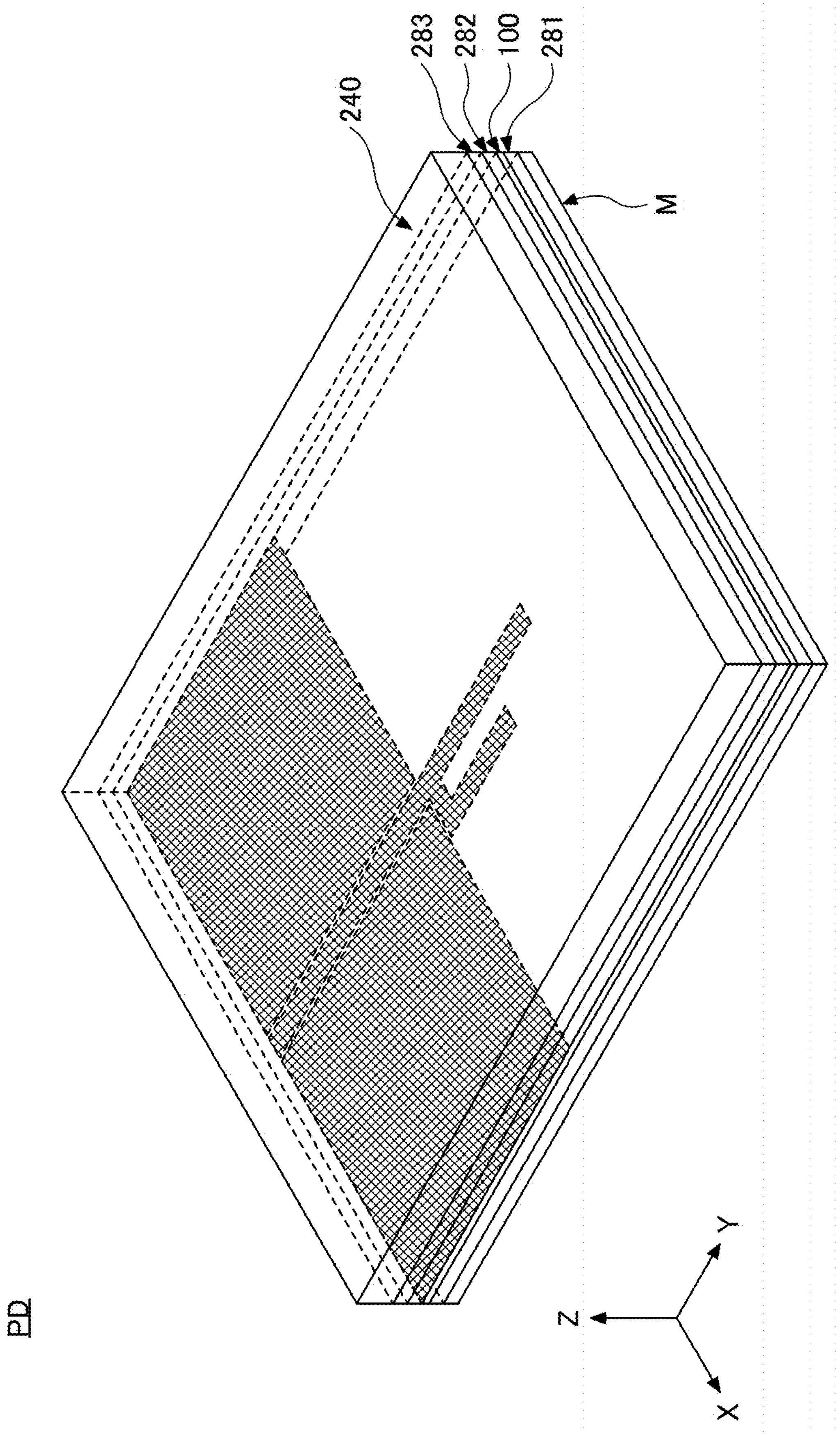
FIG. 8 is a diagram showing a pseudo display module, in which a first transparent antenna of the present invention is sandwiched by a transparent cover and a resistor simulating a display.

FIG. 8 is a diagram showing a pseudo display module PD in which the transparent antenna 100 of the first configuration example of the present invention is sandwiched between the transparent cover 240 and the metal conductor M having a predetermined resistance to simulate a display module. More specifically, on the lowermost side of the pseudo display module PD, the metal conductive layer M having a sheet resistivity of 1Ω/sq (Ohm per square, sometimes written Ω/□), which is a resistor that simulates a display or a touch panel, is disposed. An inner adhesive layer 281 is arranged on the metal conductive layer M.

As shown by (2) in FIG. 3, the transparent antenna 100 is provided between the inner adhesive layer 281 and the polarization plate 282. An outer adhesive layer 283 and the transparent cover 240 are disposed on the transparent antenna 100.

In the following, the S11 parameter characteristic values and directivities measured by the transparent antenna 100 alone in FIG. 5 and by the pseudo display module PD sandwiching the transparent antenna in FIG. 8 will be described.

When the S11 parameters and the directivities are measured, dimensions of the respective parts of the transparent antenna 1 in the transparent antenna 100 of the first configuration example shown in FIGS. 5 and 6, and in the pseudo display module PD shown in FIG. 8 are as follows, in mm:

L111: 20.5;
L112: 0.2;
L113: 1.4;
W11: 0.2;
X101: 6; and
Y101: 7.5.

Dimensions of the transparent conductor 30 constituting the antenna pattern 110 and the power supply region 120 are as follows, in μm:

Conductor thickness of the transparent conductor 30: 1;
Conductor Width w31, w32: 4; and
Line Spacing p31, p32: 120.

Thicknesses of the respective parts of the layer shown in FIG. 8 are as follows, in μm:

Thickness of the transparent cover 240: 500;
Thickness of the outer adhesive layer 283: 150;
Thickness of the polarization plate 282: 150;
Thickness of the transparent conductor 30 (110, 120): 1;
Thickness of the transparent substrate 101: 75; and
Thickness of the inner adhesive layer 281: 150.

In particular, the thickness of the transparent substrate 101 is 75 μm.

Since the surface impedance, in which the surface resistance is set, is set as the boundary condition, no thickness is set for the metal conductor M.

Figure 9:
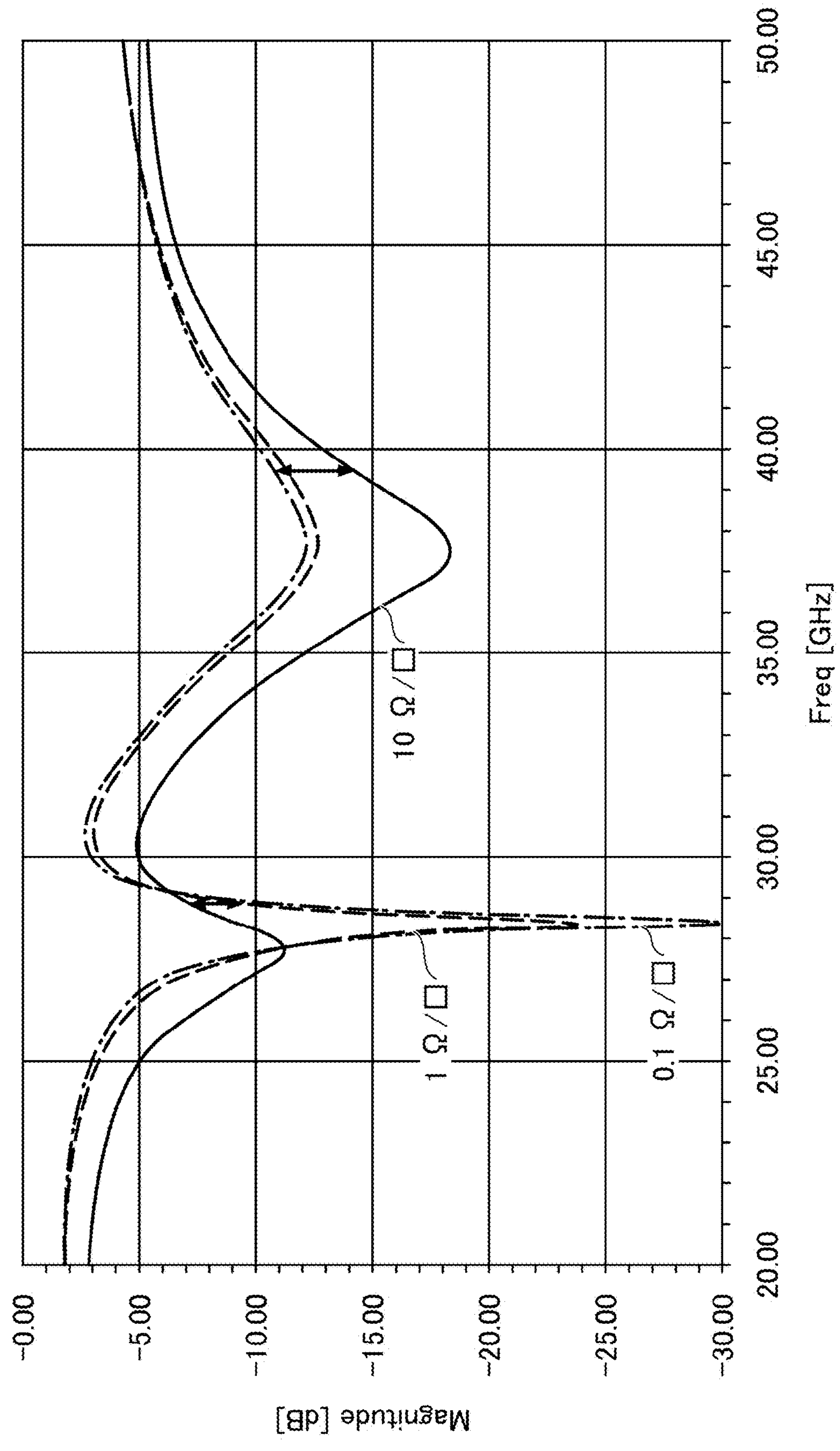
FIG. 9 is a diagram showing characteristic values of an S11 parameter in the pseudo display module of FIG. 8 when a resistance value of the resistor simulating the lower display is changed.

FIG. 9 shows the S11 parameter when the resistance value of the metal conductor M simulating the lower display is changed in the pseudo display module PD sandwiching the transparent antenna of FIG. 8. In this measurement, in the electromagnetic field simulation in which the resonant frequencies of the transparent antenna 100 shown in FIGS. 5 and 8 were set to 28 GHz and 39 GHz, the respective S11 parameters were determined for the cases where the sheet resistance values of the lower metal conductor M were 0.1Ω/sq, 1Ω/sq, and 10Ω/sq.

As shown in FIG. 9, regardless of the use of any of the metal conductors M having sheet resistance values of 0.1Ω/sq, 1Ω/sq, and 10Ω/sq, the S11 parameter had two peaks, and good values of −3 dB or less were obtained at around 28 GHz and around 39 GHz. The S11 parameter is more preferably −4 dB or less at the peak, and even more preferably −5 dB or less.

In other words, when the input reflection coefficient S11 at the frequency f GHz is written as S11 (ρ, f), at two frequencies f1 (28 GHz) and f2 (39 GHz) that are between 2 GHz and 50 GHz, $$S11(0.1\Omega/\text{sq}, 28\text{ GHz}) < -3\text{ dB and } S11(0.1\Omega/\text{sq}, 39\text{ GHz}) < -3\text{ dB};$$

$$S11(1\Omega/\text{sq}, 28\text{ GHz}) < -3\text{ dB and } S11(1\Omega/\text{sq}, 39\text{ GHz}) < -3\text{ dB; and}$$

$$S11(10\Omega/\text{sq}, 28\text{ GHz}) < -3\text{ dB and } S11(10\Omega/\text{sq}, 39\text{ GHz}) < -3\text{ dB}$$

are satisfied.

That is, by adopting the antenna design of the transparent antenna 100 as shown in FIG. 5, as shown by two thick arrows in FIG. 9, the antenna characteristics are unlikely to be changed even if the sheet resistance values of the adjacent conductors change, at 28 GHz and 39 GHz.

When an example of an electronic apparatus was disassembled and resistance values of a touch panel or a display as an on-cell metal thin wire layer were measured, it was calculated to be 0.1Ω/sq to 200Ω/sq depending on a location and a type. In the present invention, as the sheet resistance value of the touch panel, 0.1Ω/sq to 10Ω/sq or the like is used as a design guideline. Here, "on-cell" refers to a structure in which an electrode layer is directly formed on the surface of the display panel 220, instead of attaching a touch panel formed on a substrate independent from the display panel 220.

As shown in FIG. 9, even if the transparent antenna 100 of the present invention is arranged on any type of display or touch panel having a sheet resistance value of 0.1Ω/sq to 10Ω/sq, the transparent antenna 100 can operate relatively stably as an antenna in two bands around 28 GHz and around 39 GHz, that is, a dual band driven in the two frequency bands in the 5G band can be realized.

Second Configuration Example of Antenna

Next, a transparent antenna 100A according to a second configuration example of the present invention will be described with reference to FIGS. 10 and 11.

Figure 10:
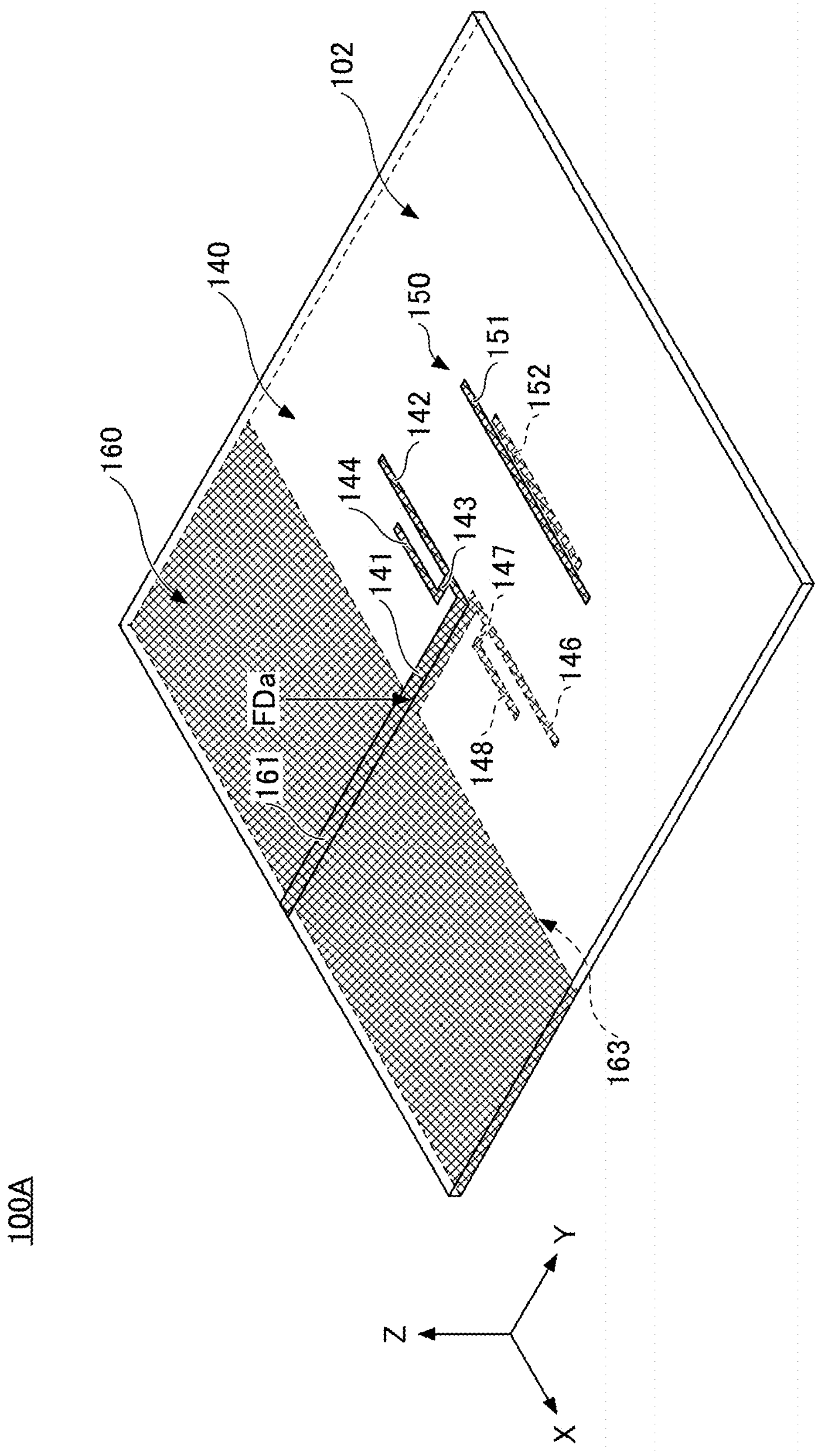
FIG. 10 is a perspective view of a transparent antenna according to a second configuration example of the present invention.

FIG. 10 is a perspective view of a transparent antenna according to a second configuration example of the present invention. FIG. 11 is an explanatory view of the transparent antenna 100A according to the second configuration example. (A) of FIG. 10 is a top view viewed from the +Z direction and (B) of FIG. 10 is a bottom view viewed from the −Z direction. Even in the case where the transparent antenna is disposed along a curve as shown in FIG. 1, FIG. 10 shows a state before the transparent antenna is bent in parallel with the XY plane.

The transparent antenna 100A of this configuration example has a transparent substrate 102; and an antenna pattern 140, a waveguide 150 (151, 152), and a power supply region 160 composed of a microstrip line are provided on the transparent substrate 102. Further, the +Y side end portion of a boundary where the power supply region 160 on the lower surface side disappears serves as a reflector 163. The antenna pattern 140 of the transparent antenna 100A is a Yagi-Uda antenna.

In the present embodiment, the microstrip line serving as the power supply region 160 is a power supply line having a transmission path 161 on the upper surface side and a ground layer 162 on the lower surface side. The transmission path 161 is provided on the surface of the substrate 102 on the +Z direction side, and is connected to a power supply point FDa of a first wire element 141.

The ground layer 162 is superposed on the transmission path 161 in a plan view on the surface of the substrate 102 on the −Z direction side. At the center of the end side of the ground layer 162 on the +Y direction side, the ground layer 162 is connected to the power supply point FDb of the fifth wire element 145.

The antenna pattern 140 in this configuration has the first wire element 141, a second wire element 142, a third wire element 143, and a fourth wire element 144 on the upper surface side.

On the upper surface side, the first wire element 141 extends in a first direction (+Y direction), which is the transmission direction, with a thickness substantially equal to that of the transmission path 161, continuously from the power supply point FDa connected to the transmission path 161. The second wire element 142 is bent from the tip of the first wire element 141 and extends in a second direction (−X direction) orthogonal to the first direction. The other end of the second wire element 142 is a free end.

The third wire element 143 branches from the periphery of the connection part of the second wire element 142 with the first wire element 141, and extends substantially in parallel with the first wire element 141 in a direction approaching the power supply region 160. The fourth wire element 144 bends from the other end of the third wire element 143 and extends in the second direction (−X direction) substantially parallel to the second wire element 142. The other end of the fourth wire element 144 is a free end, and the fourth wire element 144 is shorter than the second wire element 142.

Further, the antenna pattern 140 has a fifth wire element 145, a sixth wire element 146, a seventh wire element 147, and an eighth wire element 148 on the lower surface side.

On the lower surface side, the fifth wire element 145 extends from the power supply point FDb connected to the ground layer 162 of the power supply region 160 in a first direction (+Y direction) as the transmission direction. The sixth wire element 146 is bent from the tip of the fifth wire element 145 and extends in a second direction (+X direction) orthogonal to the first direction. The other end of the sixth wire element 146 is a free end. As shown in FIG. 11, the extending direction of the sixth wire element 146 is opposite to the extending direction of the second wire element 142.

The seventh wire element 147 branches from the periphery of the connection part of the sixth wire element 146 with the fifth wire element 145 and extends substantially in parallel with the fifth wire element 145 in the direction approaching the power supply region 160. The eighth wire element 148 is bent from the other end of the seventh wire element 147 and extends in the second direction (+X direction) substantially parallel to the sixth wire element 146. The other end of the eighth wire element 148 is a free end, and the eighth wire element 148 is shorter than the sixth wire element 146.

Figure 11:
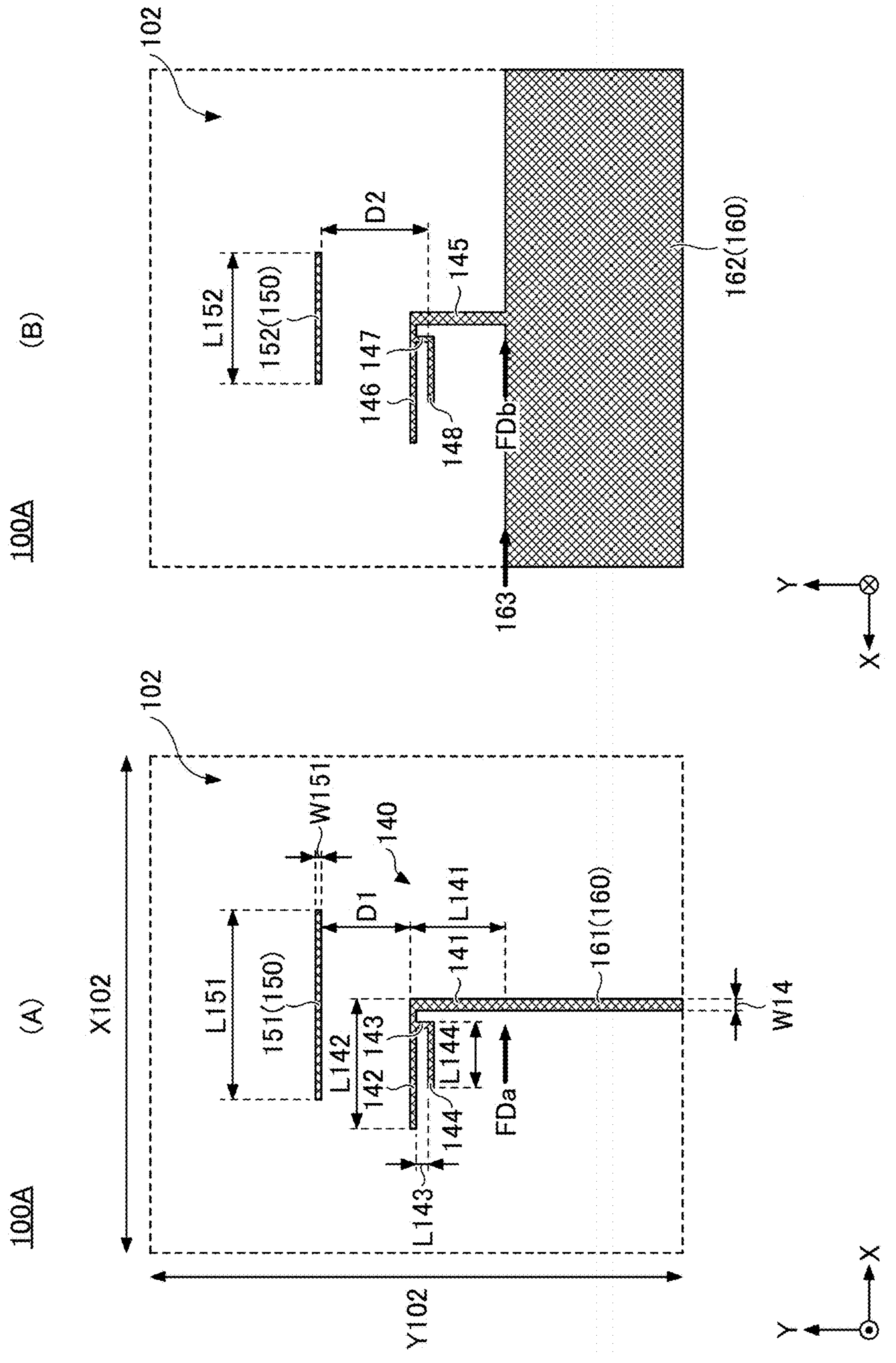
FIG. 11 is a top view (A) and a bottom view (B) of the transparent antenna according to the second configuration example.

As shown in FIGS. 10 and 11, the antenna elements 141 to 144 on the upper surface side (the front surface side) and the antenna elements 145 to 148 on the lower surface side (the rear surface side) have shapes linearly symmetric with respect to the antenna elements 141, 145 overlapping in the vertical direction as an axis.

Here, when a conductor length of the second wire element 142 is L142, and a wavelength on the transparent substrate 102 at the resonance frequency f1 (28 GHz) of the transparent antenna 100A is $\lambda_{01}$, L142 is set to be an odd number multiple of about $0.25\lambda_{01}$. Therefore, in order to improve the antenna gain in the frequency band f1, the conductor length L142 of the second wire element 142 may be adjusted, for example, to within ±10% of about 2.1 mm. The length of the sixth wire element 146 on the lower surface side is set equal to the length of the second wire element 142. The second wire element 142 and the sixth wire element 146 are radiators at a frequency of 28 GHz.

Further, when a conductor length of the fourth wire element 144 is L144 and a wavelength on the transparent substrate 102 at the resonance frequency f2 (39 GHz) of the transparent antenna 100A is $\lambda_{02}$, L144 is set to be an odd number multiple of about $0.25\lambda_{02}$. Therefore, in order to improve the antenna gain in the frequency band f2, the conductor length L144 of the fourth wire element 144 may be adjusted, for example, to within ±10% of about 1.2 mm. The length of the eighth wire element 148 on the lower surface side is set equal to the length of the fourth wire element 144. The fourth wire element 144 and the eighth wire element 148 are radiators at a frequency of 39 GHz. The slight difference from the monopole antenna at 39 GHz is a result of adjusting due to the slight difference in bending.

On the upper surface side, the waveguide 151 extends in the second direction separated from the second wire element 142 by a distance D1 in the +Y direction. The waveguide 151 is longer than the second wire element 142 and extends to the +X side beyond the position of the first wire element 141. The waveguide 151 is a waveguide at a frequency of 28 GHz, and the distance D1 is set to an odd number multiple of about $0.25\lambda_{01}$ at a frequency of 28 GHz. Further, the length of the waveguide 151 is set to be slightly shorter than about $0.5\lambda_{01}$ which is the total length of the second wire element 142 and the sixth wire element 146 that are radiators at 28 GHz, thereby ensuring capacitive property.

On the lower surface side, the waveguide 152 extends in the second direction separated from the sixth wire element 146 by a distance D2 in the +Y direction. The waveguide 152 is longer than the sixth wire element 146 and extends to the −X side beyond the position of the fifth wire element 145. The waveguide 152 is a waveguide at a frequency of 39 GHz, and the distance D2 is set to be an odd number multiple of about $0.25\lambda_{02}$ at a frequency of 39 GHz. Further, the length of the waveguide 152 is set slightly shorter than about $0.5\lambda_{02}$ which is the total length of the fourth wire element 144 and the eighth wire element 148 that are radiators of 39 GHz, thereby ensuring capacitive property.

The reflector 163, which is the boundary (cut) of the +Y side end portion of the ground layer 162, is a reflector common to 28 GHz and 39 GHz, and is longer than the antenna elements (a length of about half a wavelength obtained by adding the wire elements 142 and 146) and (a length of about half a wavelength obtained by adding the wire elements 144 and 148) which are radiators.

Since the Yagi-Uda antenna of this configuration has the waveguide 151, 152 in addition to the antenna pattern 140 formed on the front and back surfaces, it can be assumed that the Yagi-Uda antenna has 4 resonance frequencies. Therefore, as shown in the band example 2 of FIG. 4, the transparent antenna 100A of this configuration can be a triple-band (multi-band) adaptive antenna that resonates not only with the frequency bands f1 and f2 but also with the frequency band f3 of 3.3 to 5.0 GHz.

In this configuration example, the antenna pattern 140, the waveguide 150, and the transmission path 161 and the ground layer 162 of the power supply region 160 composed of microstrip lines are realized by the mesh-shaped transparent conductor 30 shown in FIG. 6.

In this configuration example, different from the first configuration example, a layer is also formed on the lower surface side, but the antenna elements 145 to 148, the waveguide 152, and the ground layer 162 of the power supply region 160 on the lower surface side can be very thinly formed by the transparent conductor 30.

Here, the thickness of the transparent conductor 30 composed of the metal thin wire layer is less than, for example, a ground substrate in a patch antenna. Therefore, the overall thickness of the transparent antenna 100A in this configuration example can be made thinner than that of the patch antenna because there is no ground substrate for the antenna pattern of the patch antenna which requires a certain thickness. For example, even when in an electronic apparatus, a large restriction is imposed such that the allowable thickness of the transparent antenna is 100 μm or less and a patch antenna cannot be contained within the thickness due to the total thickness of the transparent substrate and the ground substrate, the transparent antennas of the first and second configuration examples are thin and can be contained within the thickness restriction.

The power supply region 120 in the first configuration example is an example of a planar power supply section provided only on the surface side, and the power supply region 160 in the second configuration example is an example of a microstrip line provided on the front and back surfaces, but the configurations of the power supply region may be exchanged. More specifically, the planar power supply section shown in FIG. 5 may be applied to the power supply region of the Yagi-Uda antenna shown in FIG. 11, and the microstrip line shown in FIG. 11 may be applied to the power supply region of the monopole antenna shown in FIG. 5.

Comparative Example

Figure 12:
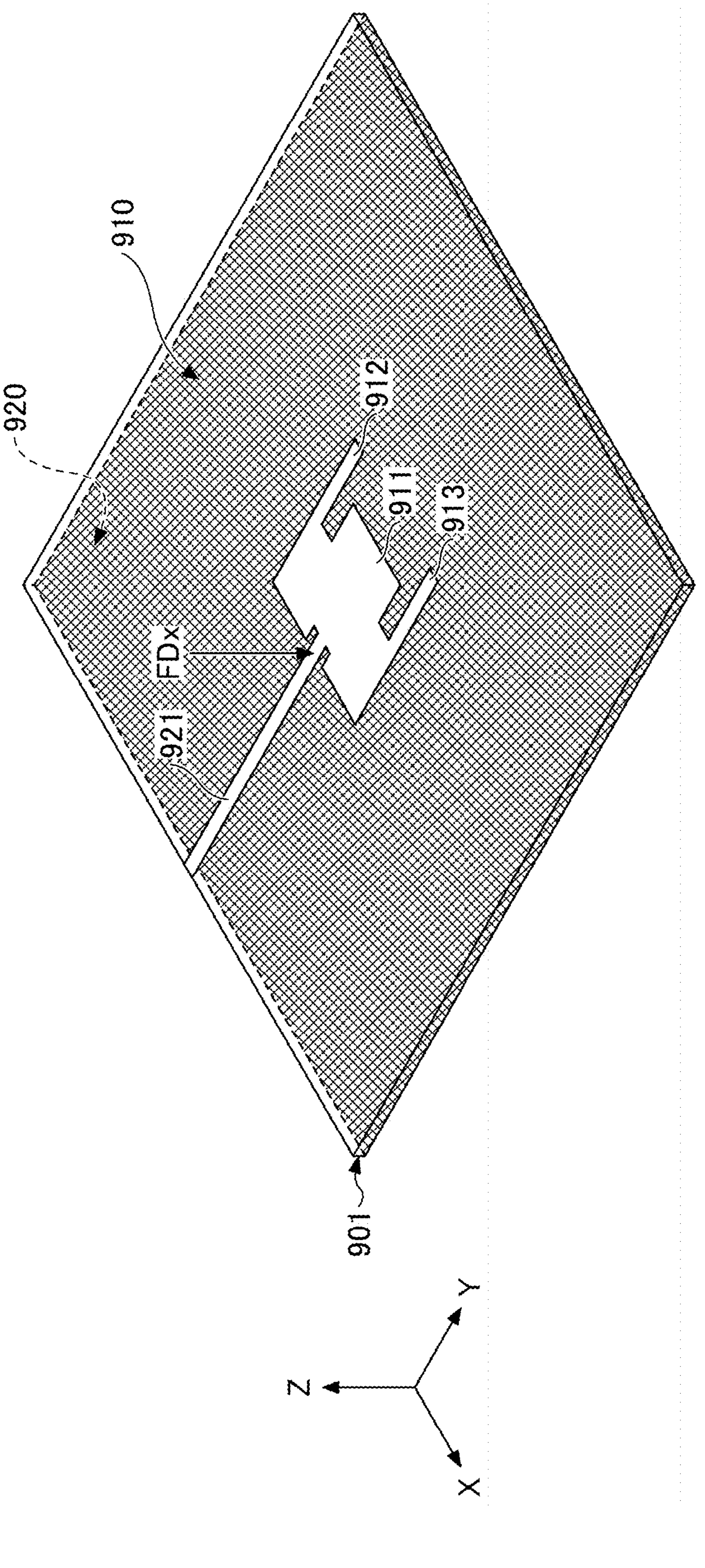
FIG. 12 is a perspective view of a transparent antenna according to a comparative example.
Figure 13:
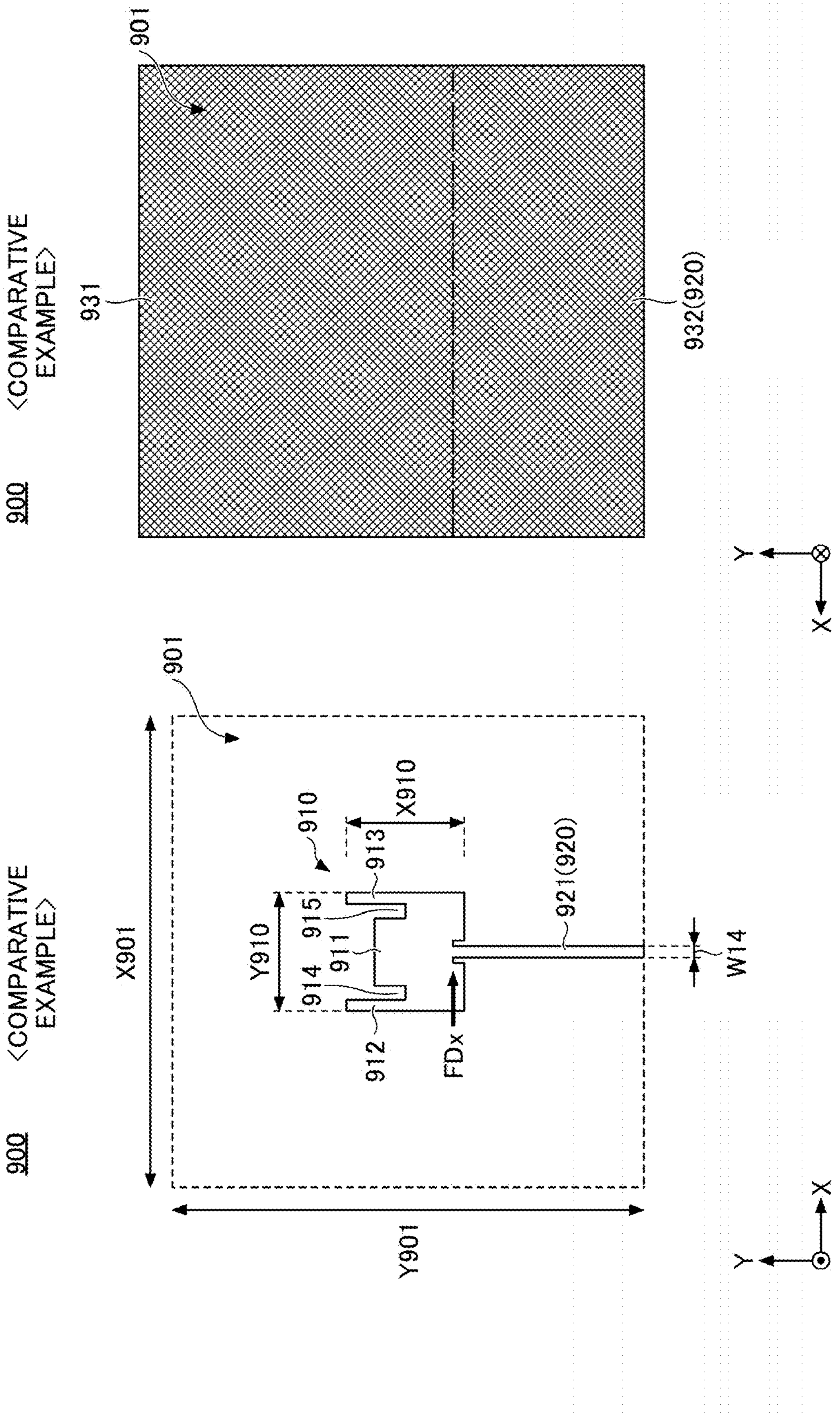
FIG. 13 is a top view (A) and a bottom view (B) of the transparent antenna according to the comparative example.

Here, the transparent antenna 900 according to the comparative example will be described with reference to FIGS. 12 and 13. FIG. 12 is a perspective view of the transparent antenna 900 according to the comparative example, and FIG. 13 is an explanatory view of the transparent antenna 900 according to the comparative example. (A) of FIG. 13 is a top view viewed from the +Z direction, and (B) of FIG. 13 is a bottom view viewed from the −Z direction.

The transparent antenna 900 has a substrate 901; and an antenna pattern 910 and a power supply region 920 are provided on the substrate 901. In this configuration, the power supply region 920 is composed of microstrip lines. The antenna pattern 910 of the transparent antenna 900 is a patch antenna.

Ground layers 931 and 932 are provided on the surface of the substrate 901 on which the antenna pattern 910 is not provided. The ground layers 931 and 932 are provided so as to overlap the antenna pattern 910 and the transmission path 921 in a plan view.

The power supply region 920 in this n comparative example is a power supply line constituted by a microstrip line and having the transmission path 921 on the upper surface side and the power supply ground layer 932 on the lower surface side. The transmission path 921 is provided on the surface of the substrate 901 on the +Z direction side, and is connected to the power supply point FDx at the substantially center of the end side of a central planar patch element 911.

The entire lower surface side of the substrate 901 is a ground layer, the +Y side portion is an antenna ground layer 931, and the −Y side portion is a power supply ground layer 932. The power supply ground layer 932 is superposed on the transmission path 921 in a plan view on the surface of the substrate 901 on the −Z direction side.

The antenna pattern 910 has a central planar patch element 911 and extension parts 912 and 913 extending from the +Y side end side of the central planar patch element to the +Y side. Grooves 914 and 915 are formed at the boundaries with the extension parts 912 and 913 at the +Y side end side of the central planar patch element 911. In the patch antenna, a patch-like antenna pattern is formed into an E-shape to be adaptive to a dual band, so that this shape is formed. However, the E-shape is merely an example for obtaining a dual band.

In this comparative example, the antenna pattern 910, the transmission path 921, the antenna ground layer 931, and the power supply ground layer 932 formed on the upper surface of the substrate 901 are realized by the mesh-shaped transparent conductor 30 shown in FIG. 6.

As will be described later, in the case of a patch antenna, it has been found that the operation characteristics of the antenna deteriorate when the antenna ground layer 931 and the antenna layer constituted by the antenna pattern 910 come close to each other. In particular, when the antenna is adaptive to two or more frequencies, deterioration is remarkable, and it becomes difficult to set equal radiation efficiencies for the two or more frequencies.

Simulation Example 2

The inventors of the present application simulated the parameter S11 as the input reflection coefficient and the radiation efficiency Eff for the transparent antennas in the first configuration example, the second configuration example, and the comparative example. FIG. 14 is a diagram showing the S11 parameter and the radiation efficiency Eff of the transparent antennas in the first configuration example and the second configuration example of the present invention, and the comparative example.

When this measurement is performed, the antenna alone of the first configuration example shown in FIG. 5 and the pseudo display module PD shown in FIG. 8 have the same dimensions as those described above. Dimensions of the respective parts of the transparent antenna 100A alone of the second configuration example shown in FIG. 10 are as follows, in mm:

L141: 2.1;
L142: 2.1;
L143: 0.2;
L144: 1.21;
L145: 2.1;
L146: 2.1;
L147: 0.2;
L148: 1.21;
L151: 3.48;
L152: 2.38;
D1: 1.6;
D2: 1.4;
W14, W15: 0.18;
X102: 9; and
Y102: 9.5.

The thickness of each part of the transparent antenna 100A formed as the pseudo display module is the same as the thickness of each part of the layer shown in FIG. 8. In the second configuration example, in addition to the above-described dimensions, a ground layer 162 or the like of a microstrip antenna formed of a metal thin wire layer of 1 μm is formed on the back-surface side of the transparent substrate 102. In particular, the thickness of the transparent substrate 102 is 75 μm, which is the same as that of the first configuration example.

Further, dimensions of the respective parts of the transparent antenna 900 according to the comparative example shown in FIG. 12 are as follows, in mm:

L911: 25;
L912: 25;
L921: 0.15;
X901: 10; and
Y901: 10.

Further, the thicknesses are as follows, in μm:

Thickness of the transparent cover 240: 500;
Thickness of the outer adhesive layer 283: 150;
Thickness of the polarization plate 282: 150;
Thickness of the transparent conductor 30 (910, 921): 1;
Thickness of the transparent substrate 901: 75;
Thickness of the transparent conductor 30 (931, 932): 1; and
Thickness of the inner adhesive layer 281: 150.

In particular, the thickness of the transparent substrate 901 is 75 μm.

In FIG. 14, the difference in radiation efficiency represents {Eff(ρ, 28 GHz)−Eff(ρ, 39 GHz)}. That is, if it is a positive value, Eff(ρ, 28 GHz)>Eff(ρ, 39 GHz). For the transparent antenna 900 which is a patch antenna, the difference in Eff is as large as 33% in two frequency bands of 28 GHz and 39 GHz in the state of the pseudo display module. The S11 parameter is also relatively large at one frequency. Therefore, it is considered that the transparent antenna 900 according to the comparative example is difficult to stably operate as an antenna at both frequencies corresponding to the dual band.

On the other hand, in the pseudo display modules of the transparent antennas 100 and 100A of the present invention, even if the surface resistivity ρ of the metal conductor is changed in the two frequency bands of 28 GHz and 39 GHz, the differences in radiation efficiency Eff are 18%, 14%, 17%, 13% and 4%, respectively, all within 20%. Thus, the transparent antennas 100 and 100A of the present invention can be operated as an antenna in two bands around 28 GHz and around 39 GHz. That is, a dual band driven in two frequency bands within the 5G band can be realized.

Thus, in the transparent antenna of the present invention, the difference in radiation efficiency Eff between the two frequency bands of 28 GHz and 39 GHz is preferably less than 25%, more preferably less than 20%, in order to achieve a dual band in the 5G band.

As shown in FIG. 14, in the pseudo display module using the transparent antenna 100 of FIG. 5, following relations are found to be satisfied:

$$S11(0.1\Omega/sq,28\ GHz)<-3\ dB,$$

$$S11(0.1\Omega/sq,39\ GHz)<-3\ dB,$$

$$S11(10\Omega/sq,28\ GHz)<-3\ dB,$$

$$S11(10\Omega/sq,39\ GHz)<-3\ dB,$$

$$|Eff(0.1\Omega/sq,28\ GHz)-Eff(0.1\Omega/sq,39\ GHz)|\leq 25\%,$$ and $$|Eff(10\Omega/sq,28\ GHz)-Eff(10\Omega/sq,39\ GHz)|<25\%,$$

Also, although a relation:

$$S11(0.1\Omega/sq,29\ GHz)<S11(0.1\Omega/sq,38\ GHz)$$

is satisfied, a relation:

$$S11(10\Omega/sq,29\ GHz)>S11(10\Omega/sq,38\ GHz)$$

is satisfied, i.e., the magnitude relations of S11 for two frequencies are opposite to each other depending on the sheet resistance of the adjacent conductors. By designing in this way, it is possible to reduce the deterioration of the characteristics due to one of the two frequencies being biased for the sheet resistance in a wide range, and to make it operate stably, which is more preferable. In such a case, when it is designed so as to make the magnitude relation of Eff unchanged, it operates more stably, which is particularly preferable.

Similarly, in the pseudo display module using the transparent antenna 100A of FIG. 10, following relations are found to be satisfied:

$$S11(0.1\Omega/sq,28\ GHz)<-3\ dB,$$

$$S11(0.1\Omega/sq,39\ GHz)<-3\ dB,$$

$$S11(10\Omega/sq,28\ GHz)<-3\ dB,$$

$$S11(10\Omega/sq,39\ GHz)<-3\ dB,$$

$$|Eff(0.1\Omega/sq,28\ GHz)-Eff(0.1\Omega/sq,39\ GHz)|25\%,$$ and $$|Eff(10\Omega/sq,28\ GHz)-Eff(10\Omega/sq,39\ GHz)|<25\%.$$

Also, although a relation:

$$\mathrm{Eff}(0.1\Omega/\mathrm{sq},29\ \mathrm{GHz})>\mathrm{Eff}(0.1\Omega/\mathrm{sq},38\ \mathrm{GHz})$$

is satisfied, a relation:

$$\mathrm{Eff}(10\Omega/\mathrm{sq},29\ \mathrm{GHz})<\mathrm{Eff}(10\Omega/\mathrm{sq},38\ \mathrm{GHz})$$

is satisfied, i.e., the magnitude relations of Eff for two frequencies are opposite to each other. By designing in this way, it is possible to reduce the deterioration of the characteristics due to one of the two frequencies being biased for the sheet resistance in the wide range, and to make it operate stably in well balance, which is more preferable. In such a case, when it is designed so as to make the magnitude relation of S11 unchanged, it operates more stably, which is particularly preferable.

Thus, in the present invention, by setting the behavior of the values of S11 and the radiation efficiency Eff with respect to the sheet resistance at the two frequencies, particularly stable antenna characteristics can be obtained.

For example, since the electronic apparatus can be adaptive to the dual band, when one line is busy or in a bad radio wave state, the frequency band can be switched. In the present invention, since the transparent antenna can operate in two frequency bands, the two frequency bands can be switched only by one antenna.

As an example of an antenna pattern in a transparent antenna, the monopole antenna in the first configuration example and the Yagi-Uda antenna in the second configuration example have been described. However, the antenna pattern of the present invention may be a dipole antenna, a Vivaldi antenna, or a log-periodic antenna. Even in the case of the dipole antenna, the Vivaldi antenna, or the log-periodic antenna, the same effect can be obtained by applying the above-described design to S11 and Eff.

In the case of the dipole antenna, it can be particularly easily realized by adopting an antenna pattern configuration in which the waveguides 151 and 152 are removed from the Yagi-Uda antenna shown in FIG. 10.

Third Configuration Example

Figure 15:
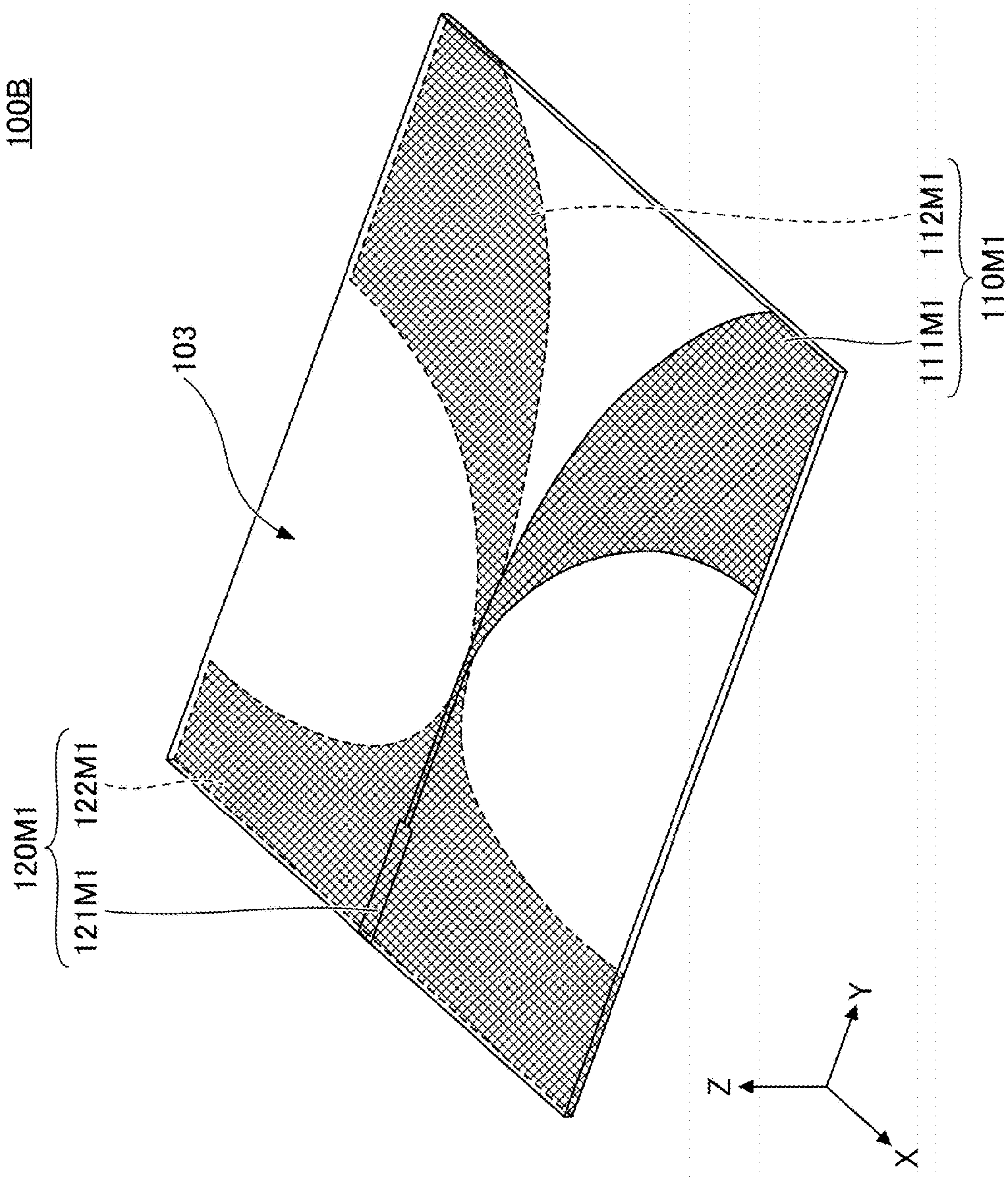
FIG. 15 is a perspective view of a transparent antenna according to a third embodiment of the present invention.

FIG. 15 is a diagram showing a transparent antenna 100B according to a third configuration example of the present invention. The transparent antenna 100B of this configuration example has a transparent substrate 103; and an antenna pattern 110M1, and a power supply region 120M1 composed of a microstrip line are provided on the transparent substrate 103. The antenna pattern 110M1 of the transparent antenna 100B is a Vivaldi antenna.

In the same manner as the second configuration example, the power supply region 120M1 in this configuration example is a microstrip line and is a power supply line having a transmission path 121M1 on the upper surface side and a ground layer 122M1 on the lower surface side. The transmission path 121M1 is linearly provided on the surface of the transparent substrate 103 on the +Z direction side, and is connected to the upper surface side element 111M1. The ground layer 122M1 is provided in a planar shape on the −Z side surface of the transparent substrate 103, and the +Y side end side is curved so that the center portion thereof is pointed to the +Y side, and is connected to the lower surface side element 112M11.

The antenna pattern 110M1 has an upper surface side element 111M1 and a lower surface side element 112M1. The upper surface side element 111M1 is linearly connected from the transmission path 121M1 of the power supply region 120M1, and, while gradually expanding, extends to a corner portion of the transparent substrate 103 in the +Y direction and the +X direction. The lower surface side element 112M1 is connected from the center of the ground layer 122M1 of the power supply region 120M1, and, while gradually expanding, extends to the corner portion of the transparent substrate 103 in the +Y direction and the −X direction.

The power supply region 120M1 and the antenna pattern 110M1 in FIG. 15 are formed of a transparent conductor 30 which is a lattice-like metal thin wire layer as shown in FIG. 7.

Also in this configuration example, when the above-described design is applied to S11 and Eff, the same effect is obtained.

Further, although the single transparent antenna of the present invention can realize a dual band, the antenna may be arranged in an array state (antenna array) in which a plurality of transparent antennas are collected, in order to enhance the characteristics.

Although the transparent antennas of the exemplary embodiments of the present invention have been described above, the present invention is not limited to the specifically disclosed embodiments, and various variations and modifications may be made without departing from the scope recited in claims.

What is claimed is:

1. A transparent antenna used by being placed in proximity to a metal conductor, comprising:

a transparent substrate; and a metal thin wire layer on an upper side of the transparent substrate, wherein the transparent substrate has a thickness of 300 μm or less, the metal thin wire layer has an opening ratio of 80% or more, wherein the metal conductor has a surface resistivity ρ-Ω/sq and is disposed below and parallel to the transparent antenna 0.15 mm apart, and wherein an input reflection coefficient S11 (ρ, f) and a radiation efficiency Eff(ρ, f) at a frequency f satisfy relations $$S11(0.1\Omega/\mathrm{sq},f1\ \mathrm{GHz})<-3\ \mathrm{dB},$$

$$S11(0.1\Omega/\mathrm{sq},f2\ \mathrm{GHz})<-3\ \mathrm{dB},\ \text{and}$$

$$|\mathrm{Eff}(0.1\Omega/\mathrm{sq},f1\ \mathrm{GHz})-\mathrm{Eff}(10\Omega/\mathrm{sq},f2\ \mathrm{GHz})|<25\%$$

at two frequencies f1 and f2 that are between 2 GHz and 50 GHz.

2. The transparent antenna according to claim 1, wherein relations $$S11(10\Omega/\mathrm{sq},f1\ \mathrm{GHz})<-3\ \mathrm{dB},$$

$$S11(10\Omega/\mathrm{sq},f2\ \mathrm{GHz})<-3\ \mathrm{dB},\ \text{and}$$

$$|\mathrm{Eff}(10\Omega/\mathrm{sq},f1\ \mathrm{GHz})-\mathrm{Eff}(10\Omega/\mathrm{sq},f2\ \mathrm{GHz})|<25\%$$

are satisfied.

3. The transparent antenna according to claim 1, wherein a sign of a value of $$S11(0.1\Omega/\mathrm{sq},f1\ \mathrm{GHz})-S11(0.1\Omega/\mathrm{sq},f2\ \mathrm{GHz})$$

and a sign of a value of $$S11(10\Omega/\mathrm{sq},f1\ \mathrm{GHz})-S11(10\Omega/\mathrm{sq},f2\ \mathrm{GHz})$$

are different from each other.

4. The transparent antenna according to claim 1, wherein a sign of a value of $$\mathrm{Eff}(0.1\Omega/\mathrm{sq},f1\ \mathrm{GHz})-\mathrm{Eff}(0.1\Omega/\mathrm{sq},f2\ \mathrm{GHz})$$

and a sign of a value of $$\mathrm{Eff}(10\Omega/\mathrm{sq},f1\ \mathrm{GHz})-\mathrm{Eff}(10\Omega/\mathrm{sq},f2\ \mathrm{GHz})$$

are different from each other.

5. The transparent antenna according to claim 1, wherein relations $$|Eff(0.1\Omega/sq, 28\ GHz) - Eff(0.1\Omega/sq, 39\ GHz)| < 25\%,$$

and $$|Eff(10\Omega/sq, 28\ GHz) - Eff(10\Omega/sq, 39\ GHz)| < 25\%$$

are satisfied.

6. The transparent antenna according to claim 1, wherein the transparent antenna has an antenna pattern that is composed of the metal thin wire layer and a power supply region, and the antenna pattern does not have a ground layer on the back-surface side of the transparent antenna.

7. The transparent antenna according to claim 6, wherein the antenna pattern is a monopole antenna, a Yagi-Uda antenna, a dipole antenna, a Vivaldi antenna or a log-periodic antenna.

8. The transparent antenna according to claim 7, wherein the antenna pattern is a monopole antenna, and the antenna pattern includes:

a first wire element extending in a first direction from a power supply point connected to the power supply region, the first direction being a transmission direction;

a second wire element branching from a periphery of a connection portion of the first wire element with the power supply region, and extending in a second direction that is orthogonal to the first direction; and a third wire element bent from another end of the second wire element and extending in the first direction substantially parallel to the first wire element.

9. The transparent antenna according to claim 7, wherein the antenna pattern is a Yagi-Uda antenna, the antenna pattern includes: p1 a first wire element extending in a first direction from a power supply point connected to the power supply region, the first direction being a transmission direction;

a second wire element bent from a tip of the first wire element, and extending in a second direction that is orthogonal to the first direction;

a third wire element branching from a periphery of a connection portion of the second wire element with the first wire element, and extending substantially parallel to the first wire element; and a fourth wire element bent from another end of the third wire element, and extending in the second direction substantially parallel to the second wire element, the transparent antenna further comprising:

a waveguide extending in the second direction separated from the second wire element; and an end side of a leading edge in the transmission direction of the power supply region, the end side functioning as a reflector.

10. The transparent antenna according to claim 1, wherein the frequency f1 is from 24.2 to 29.5 GHz, and the frequency f2 is from 37.3 to 40 GHz.

11. The transparent antenna according to claim 1, wherein the input reflection coefficient S11 (ρ, f) at a third frequency f3 that is between 2 GHz and 50 GHz satisfies relations $$S11(0.1\Omega/sq, f3\ GHz) < -3\ dB,$$ and $$S11(10\Omega/sq, f3\ GHz) < -3\ dB$$

and the frequency f3 is from 3.3 to 5.0 GHz.

12. The transparent antenna according to claim 1, wherein the transparent antenna has a directivity in a direction orthogonal to an antenna plane when a conductive plate is placed at a bottom.

13. An antenna array comprising:

a plurality of transparent antennas including the transparent antenna according to claim 1 that are arranged in an array state.

14. A display module comprising:

the transparent antenna according to claim 1;

a display; and a cover glass, wherein the transparent antenna is disposed under or below the cover glass and on or above the display.

* * * * *